United States Patent [19]

Mourier

[11] Patent Number: 5,245,532
[45] Date of Patent: Sep. 14, 1993

[54] ELECTRONIC MAIL FOLLOW-UP SYSTEM

[75] Inventor: Yves P. Mourier, Lagny, France

[73] Assignee: International Business Machines Corporation, Armonk, N.Y.

[21] Appl. No.: 364,944

[22] Filed: Jun. 12, 1989

[30] Foreign Application Priority Data

Jun. 16, 1988 [EP] European Pat. Off. ........ 88480016.0

[51] Int. Cl.[5] ........................ G06F 15/40; G06F 13/00
[52] U.S. Cl. .................................... 364/400; 395/650; 395/700
[58] Field of Search .............................. 395/650, 700

[56] References Cited

U.S. PATENT DOCUMENTS

| | | | |
|---|---|---|---|
| 4,754,428 | 6/1988 | Schultz et al. | 395/500 |
| 4,914,583 | 4/1990 | Weisshaar et al. | 364/200 |
| 4,918,588 | 4/1990 | Barrett et al. | 364/200 |
| 4,935,870 | 6/1990 | Burk, Jr. et al. | 364/200 |
| 4,965,719 | 10/1990 | Shoens et al. | 364/200 |
| 4,977,520 | 12/1990 | McGaughey, III et al. | 364/521 |
| 5,040,141 | 8/1991 | Yazima et al. | 395/200 |

Primary Examiner—Gareth D. Shaw
Assistant Examiner—John Q. Chavis
Attorney, Agent, or Firm—Andrew J. Dillon

[57] ABSTRACT

In a data processing and transmission digital network wherein users have been individually assigned a virtual machine including a memory zone and a capability for sharing hardware and software facilities for entering processing and mailing data to one another using terminal keyboards attached to the network, a mail follow-up system is provided for monitoring and processing selected mail items. The system includes a facility for generating mail tags including predefined fields; a facility for tracking the mail and deriving therefrom mail characteristic data; a facility for storing said characteristic data into tag fields; a facility for storing the filled-in tags into a file and for accessing and processing predefined mail fields, whereby processed tags are automatically transferred to different tag files. The system further includes an administrator system for centrally administrating the tagged mail on a departmental basis.

5 Claims, 30 Drawing Sheets

| FILELIST | FILELIST | FILELIST |
|---|---|---|
| $GENCTR$ $FLUPma$ | TOTO NETLOG | $GENCTR$ FLUPma$ |
| | NOTEBOOK ALL | TOTO NETLOG |
| | $GENCTR$ $FLUPma$ | NOTEBOOK ALL |
| | - | |
| | - | |
| NOTEBOOK ALL | - | |
| NOTE OFSLOGf1 | - | |
| TOTO NETLOG | NOTE OFSLOG f1 | NOTE OFSLOGf1 |

FIG. 6a     FIG. 6b     FIG. 6c

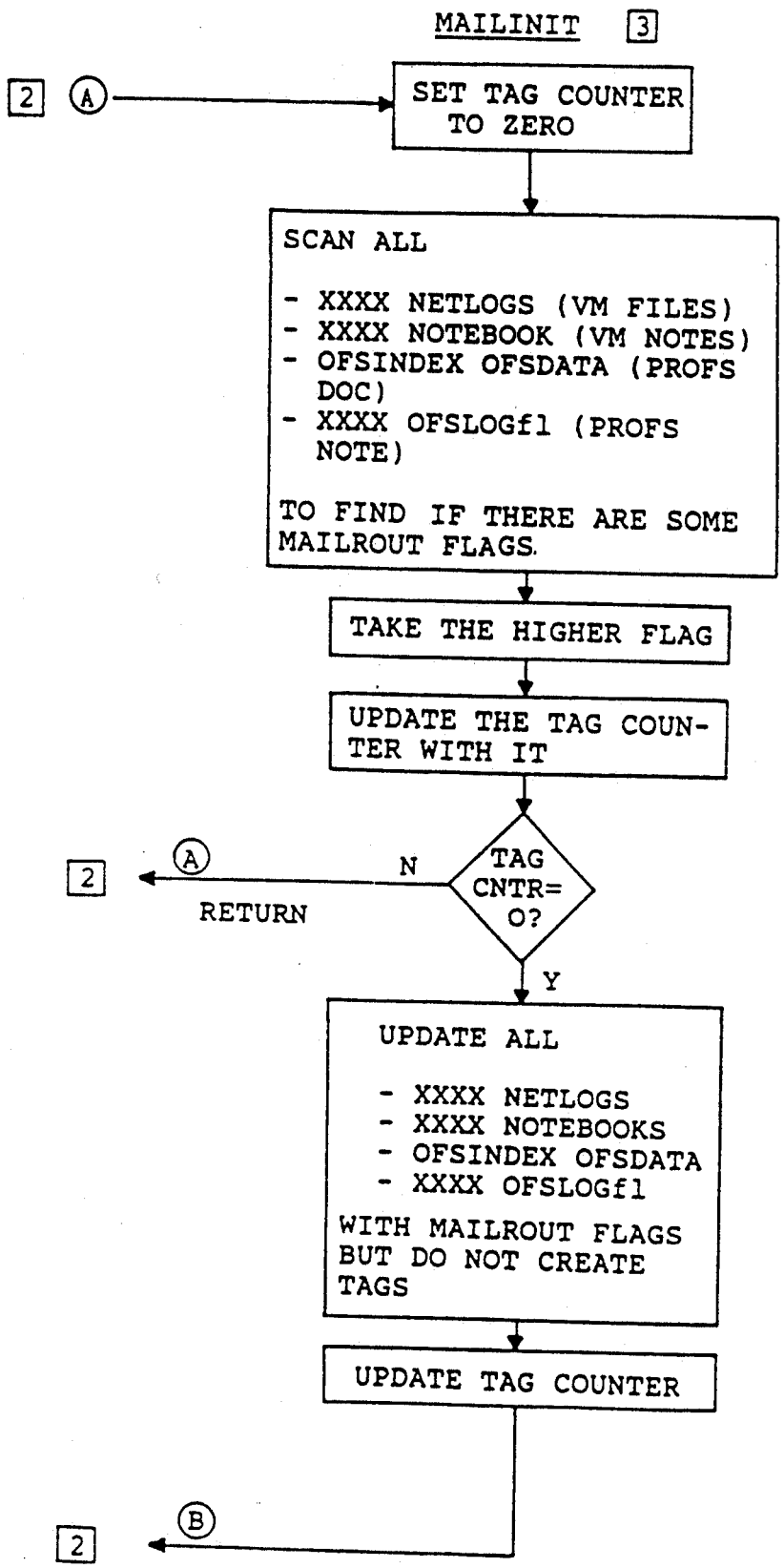

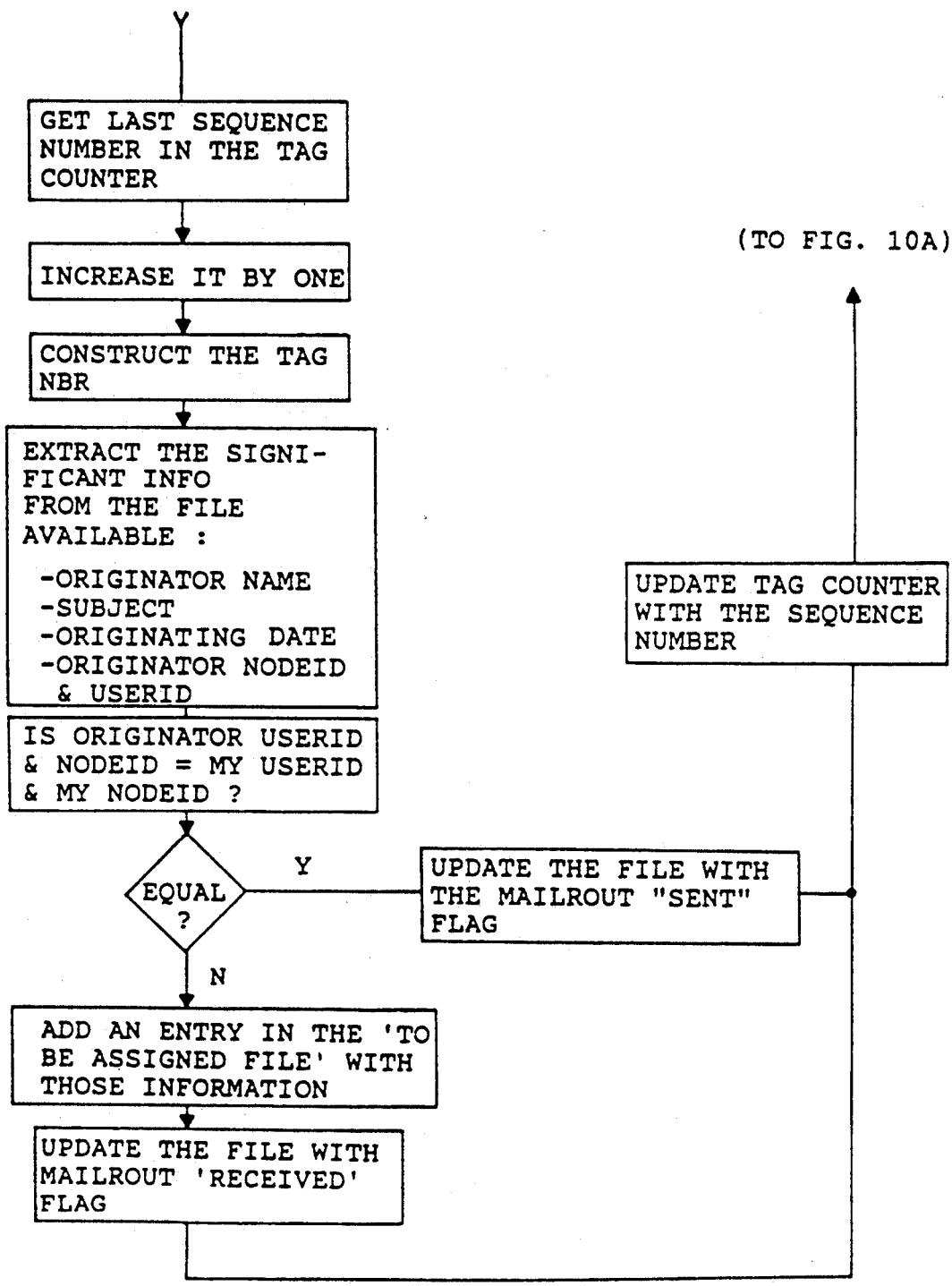

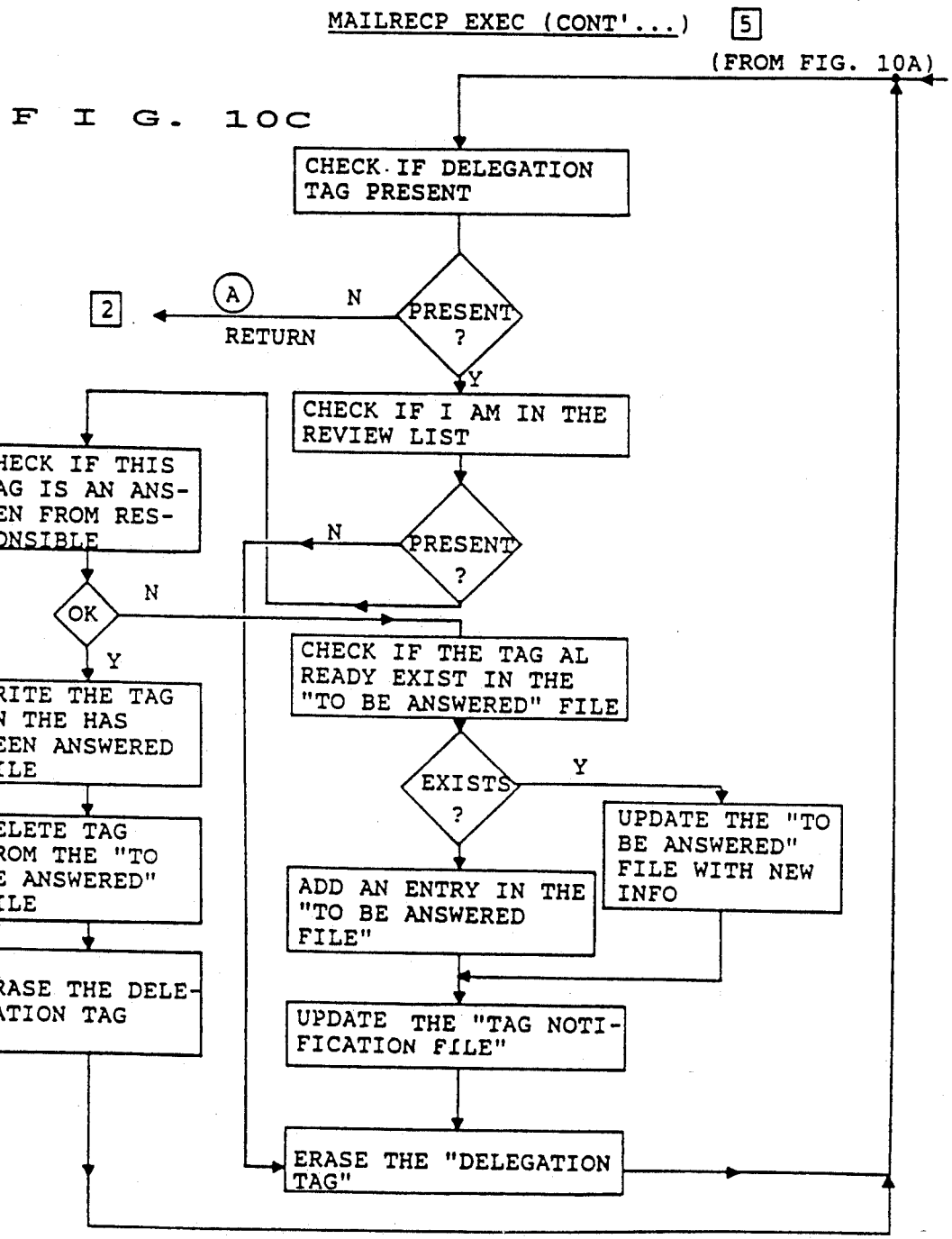

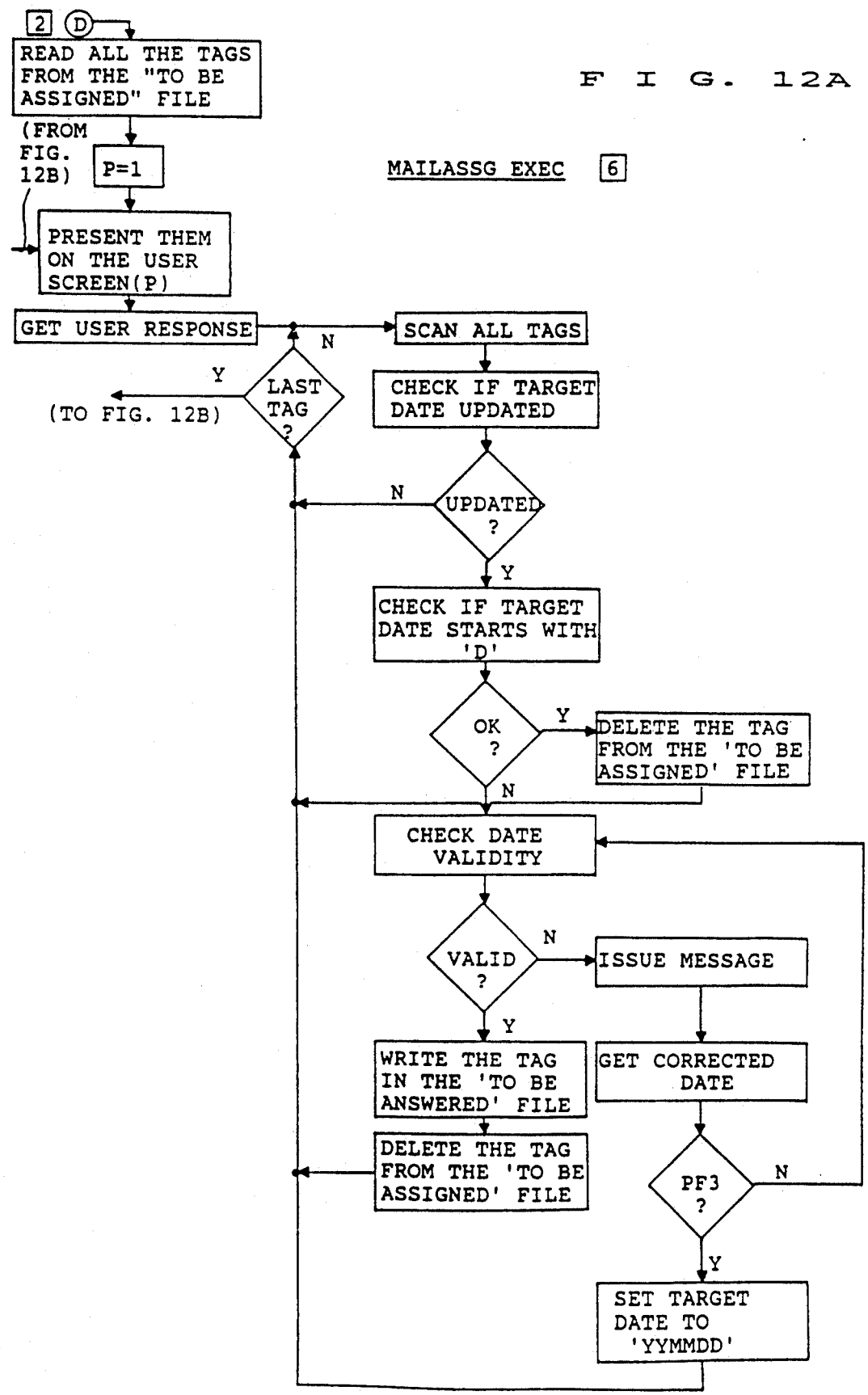

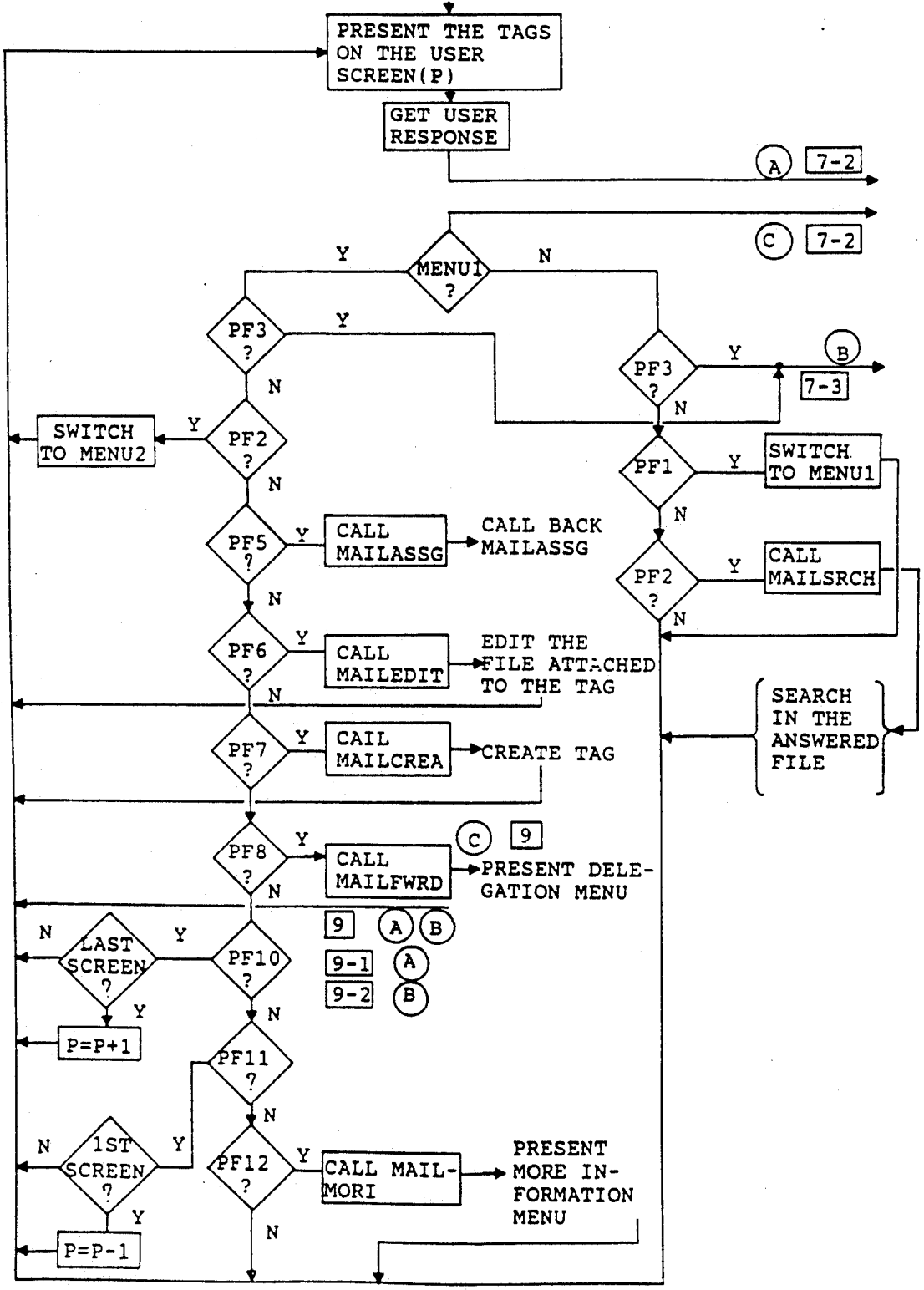

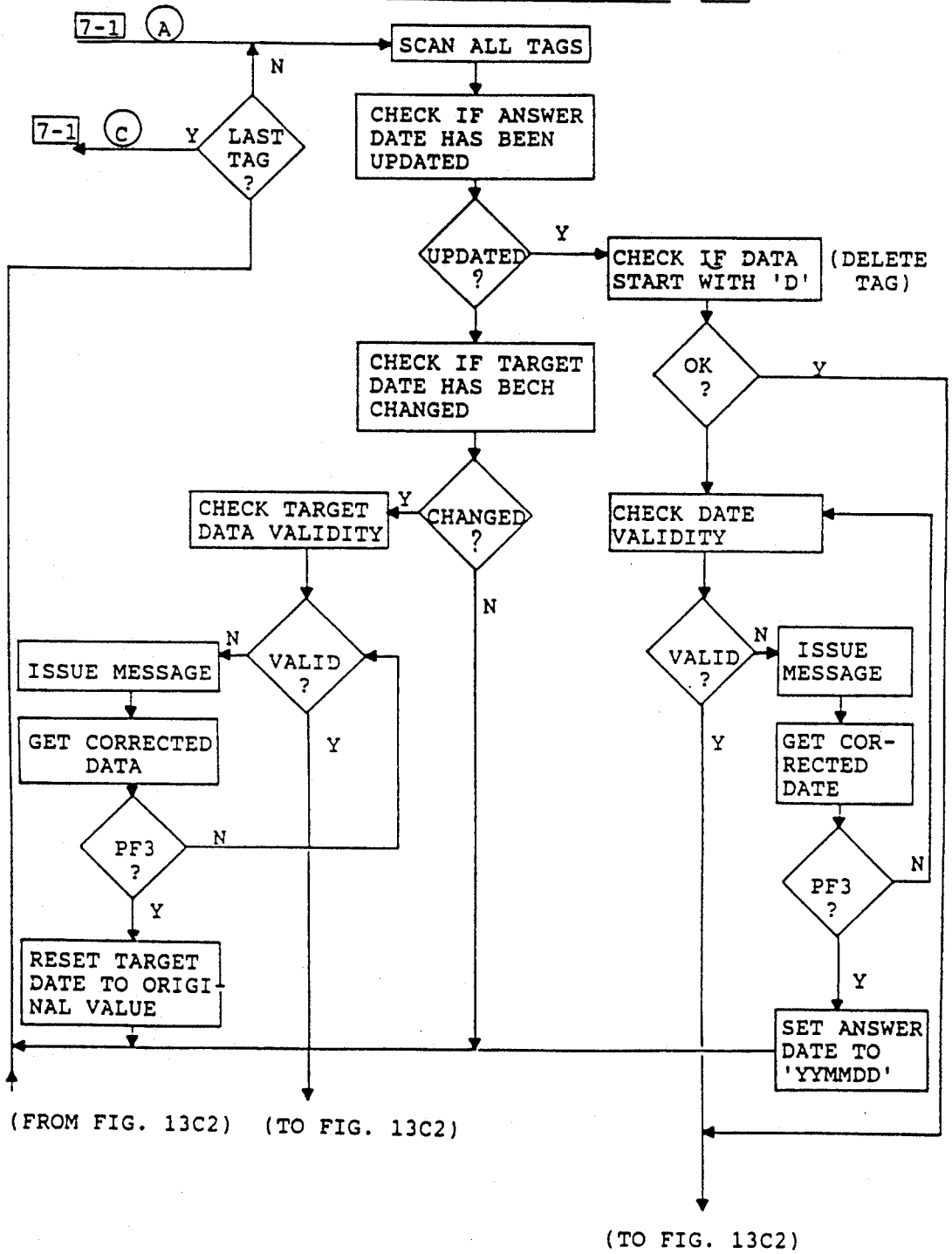

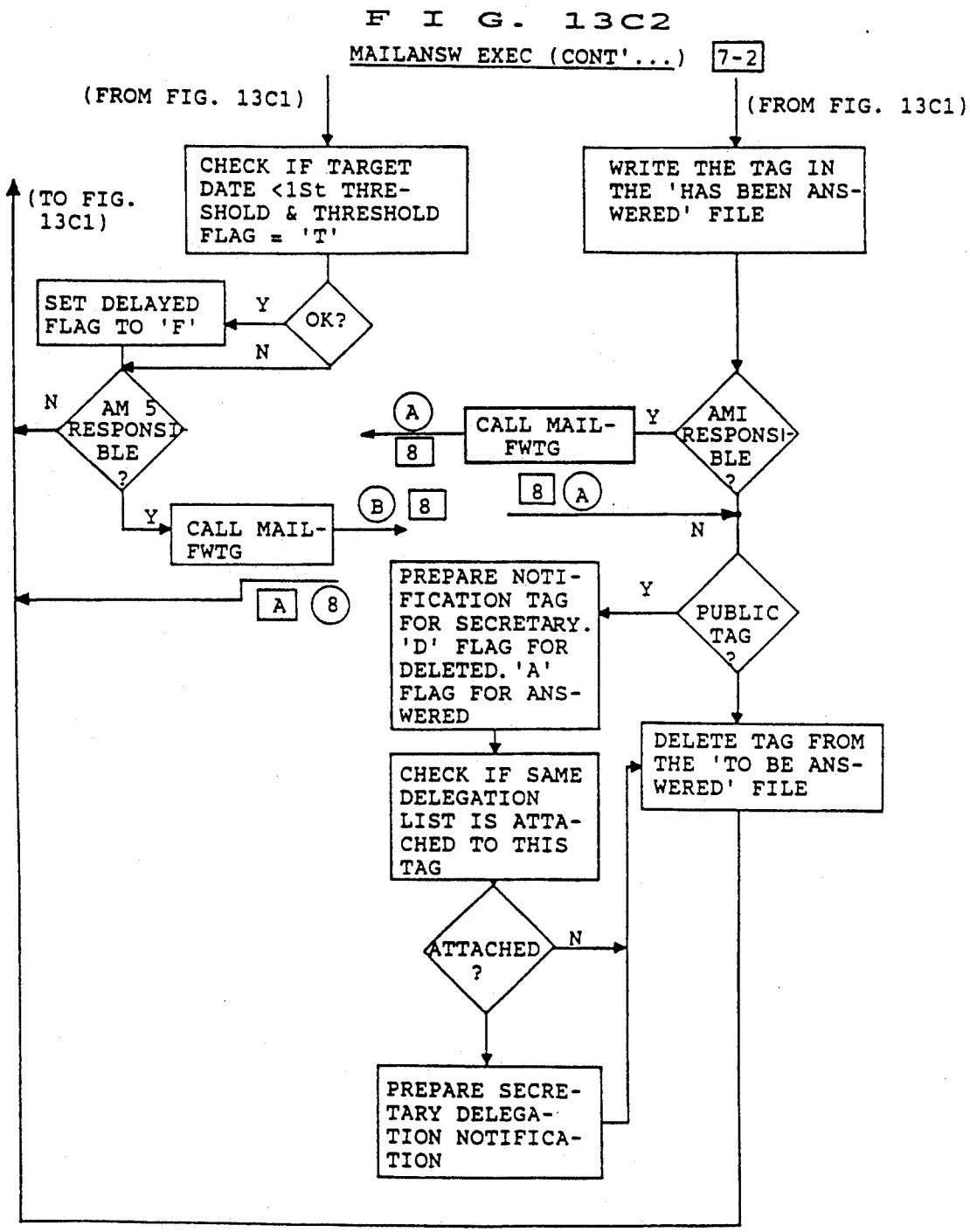

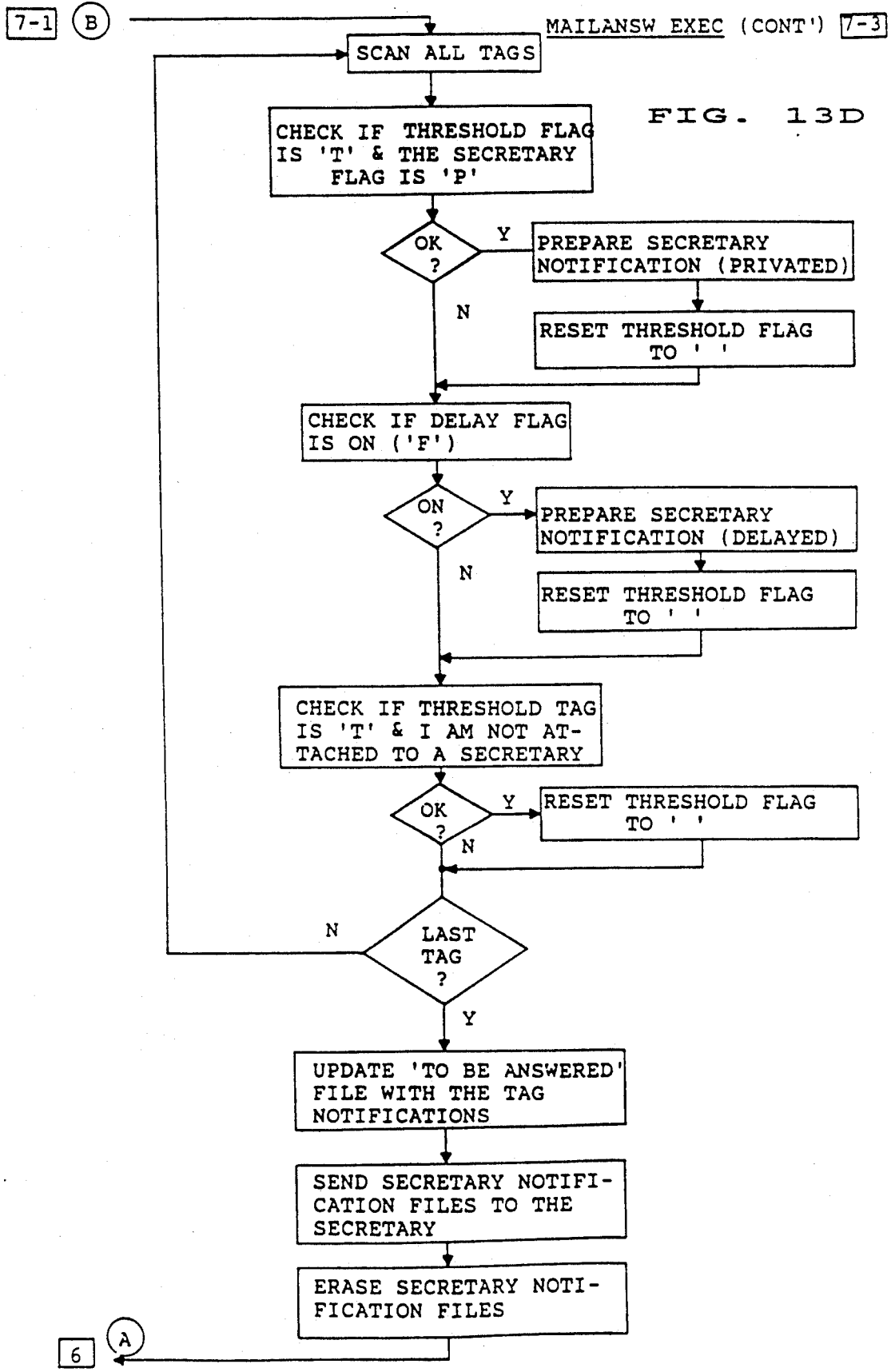

MAILTWTR EXEC  [10]

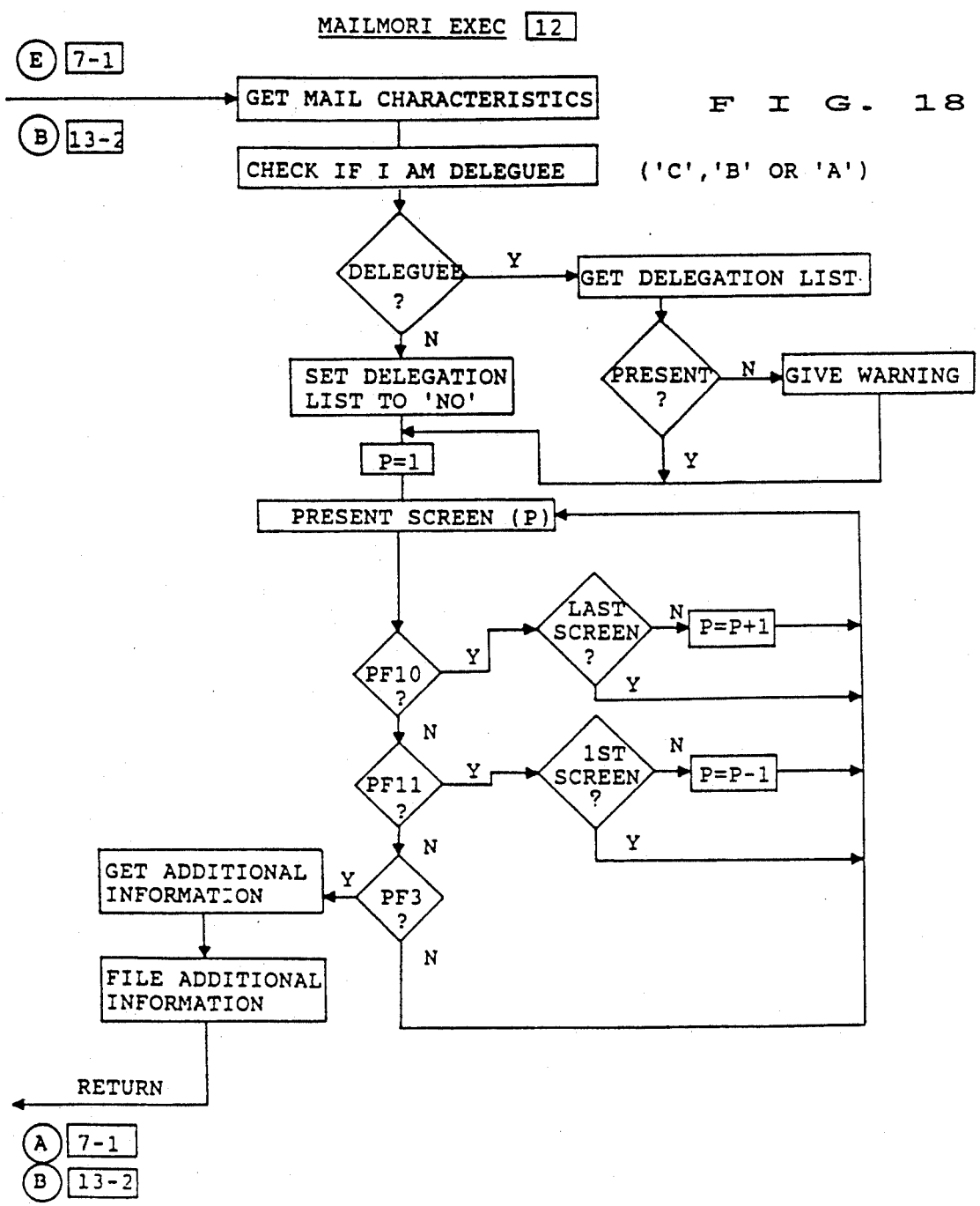

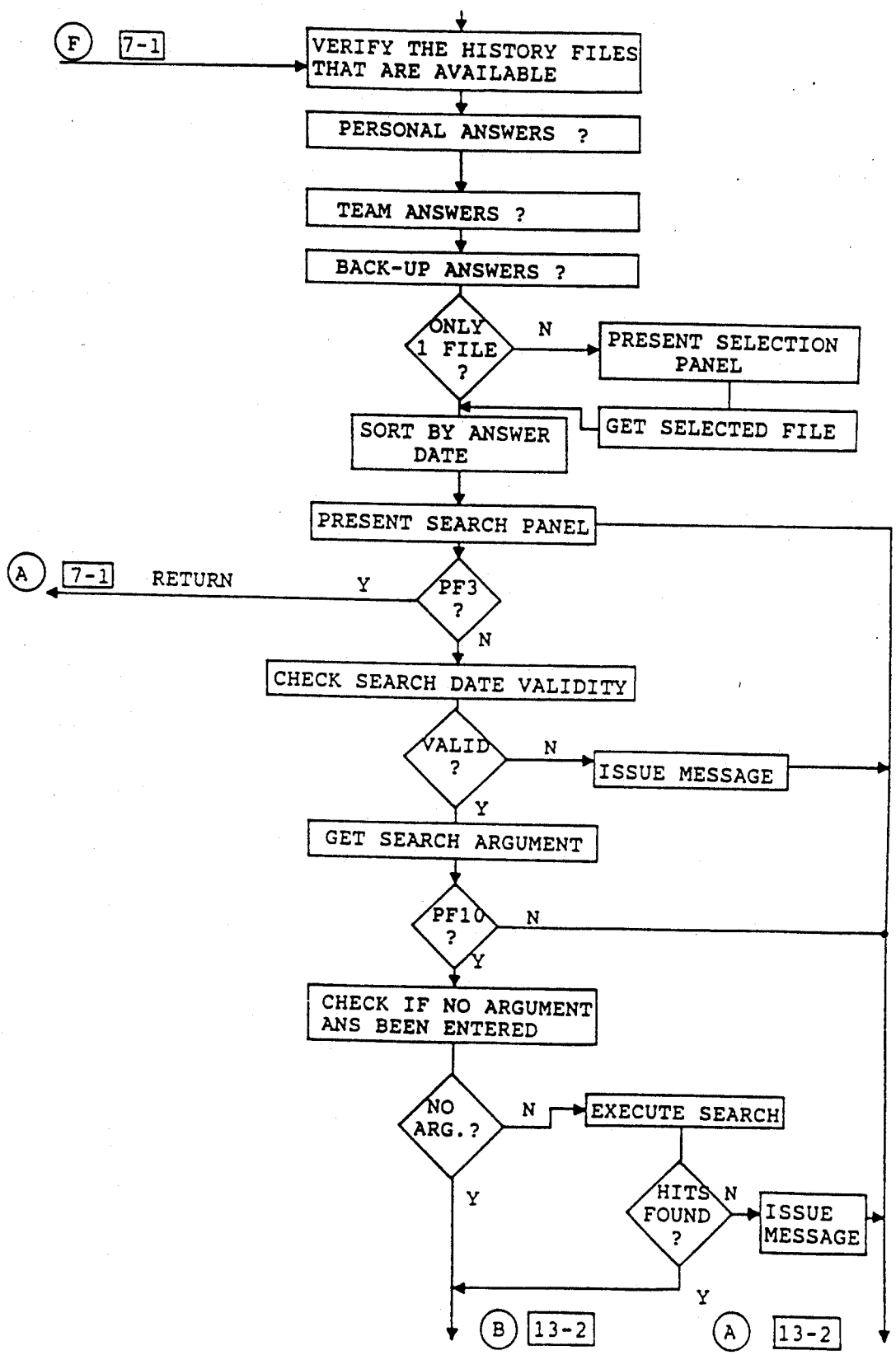

ELECTRONIC MAIL FOLLOW-UP SYSTEM

FIELD OF THE INVENTION

This invention deals with information handling systems and more particularly with electronic mailing systems.

BACKGROUND OF THE INVENTION

Communications through digital networks are expanding at a fairly high rate. In other words, users attached to said networks exchange a lot of files through electronic mail, with some, if not most, of these files requiring action.

Obviously, with the advent of electronic mail, it has become increasingly difficult to keep-up with the incoming flow of exchanged files both at the individual, departmental and/or organizational levels. Organizing one's work/activity schedule has now become a real concern for the user, unless each file is printed and handled the archaic ways it used to be in the past. This would be an inefficient processing way for electronic mail and today's facilities preclude sticking to an outdated way of organizing and scheduling one's work.

SUMMARY OF THE INVENTION

This invention addresses the mail follow-up problems and provides an efficient solution to these problems at both individual and departmental levels, for tracking, scheduling and in a broader sense managing electronic mail.

More particularly the invention addresses a system for automatically following-up mail to enable the addressee's (and/or sender) attention being automatically called upon received/sent mail, action to be taken, action taken, target dates for action and several other items of importance to mail processing.

The invention also addresses an improved system for a more elaborate mail follow-up within a predefined group of users (a Department) attached to the same electronic mail system, for enabling delegating mail processing, tracking by another individual the mail to be processed, automatically performing statistical operations, reporting to management level etc. . . .

In other words, the invention provides means for processing electronic mail not only on an individual user stand alone basis but also on an elaborate group basis by adding coordinating means and group managing means.

BRIEF DESCRIPTION OF THE DRAWINGS

FIGS. 6, (a)–(c) illustrate a mail follow-up operation.

FIGS. 7–10(c) and 12–19(B) represent flow-charts for implementing the follow-up system for a conventional user.

DESCRIPTION OF THE PREFERRED EMBODIMENT

Figure 1:
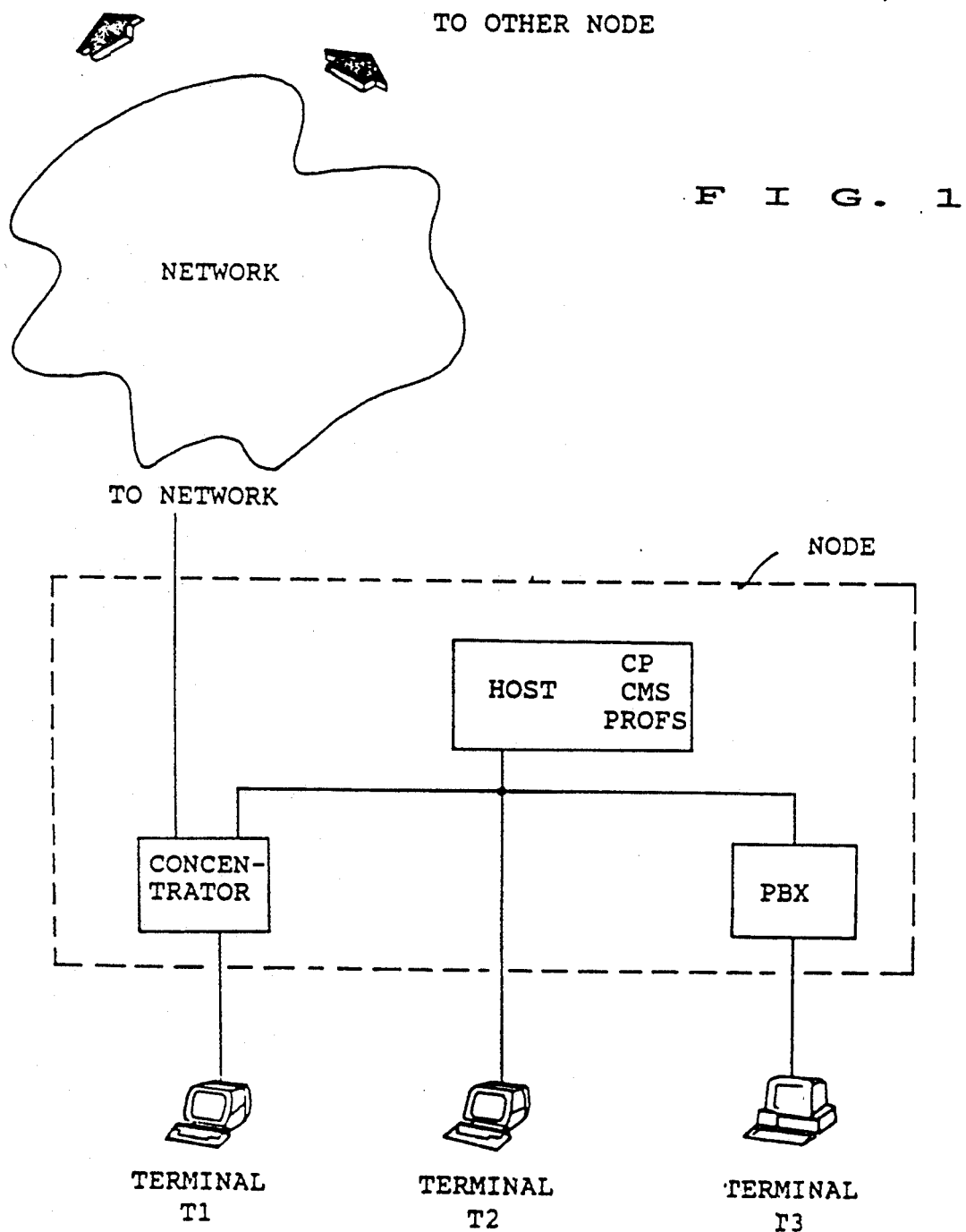
FIG. 1 represents a digital network node.

Represented in FIG. 1 is a digital network node including both application resources and communication resources. Terminals T1, T2, . . . for instance IBM 327X or 317X, i.e. intelligent displays, are attached to a host computer (IBM 3033) either directly, or through a concentrator or Communication Controller (IBM 3725) or a PBX for remote terminals. Several similar nodes are connected into a digital network leading thus to thousands of terminals attached to the network. Users sitting at any terminal do both perform selected tasks using the network software resources, and communicate with each other at will, day and night, by simple keyboard operations.

Assume the system including the host computer is operating in a VM/SP environment. Each person, or end user, is assigned a Virtual Machine (machine) in the computer system within a given node of the network. Virtual Machine means in fact a predetermined size memory location and authorization to share common computer hardware and resources, essentially including the IBM Control Program (CP) and Conversational Monitor System (CMS), each including its own types of services. CP manages system resources and provides an individual working environment for each person using the system. Resource managed by CP include: Processor functions; processor storage and input/output devices. CP creates the system work environment. It controls the system resources that are available to the user during a work session.

CMS, although a component of VM/SP operating system, is itself an operating system running under CP. AS the name "conversational" implies, there is a two way communication between the system users and CMS.

For more detailed information on IBM CP and CMS one may refer to the following IBM documents:

Virtual Machine/System Product: CMS Command and Macro Reference, SC19-6209.

Virtual Machine/System Product: CMS USER's Guide, SC19-6210.

Virtual Machine/System Product: CP Command Reference for General Users, SC19-6211.

Virtual Machine/System Product: System Product Editor User's Guide, SC24-5220.

Virtual Machine/System Product: System Product Editor Command and Macro Reference, SC24-5221.

Virtual Machine/System Product: System Product Interpreter User's Guide, SC24-5238.

Virtual Machine/System Product: System Product Interpreter Reference, SC24-5239.

Document Composition Facility—Introduction to the Generalized Markup Language: Using the Starter Set, SH20-9186.

Figure 2:
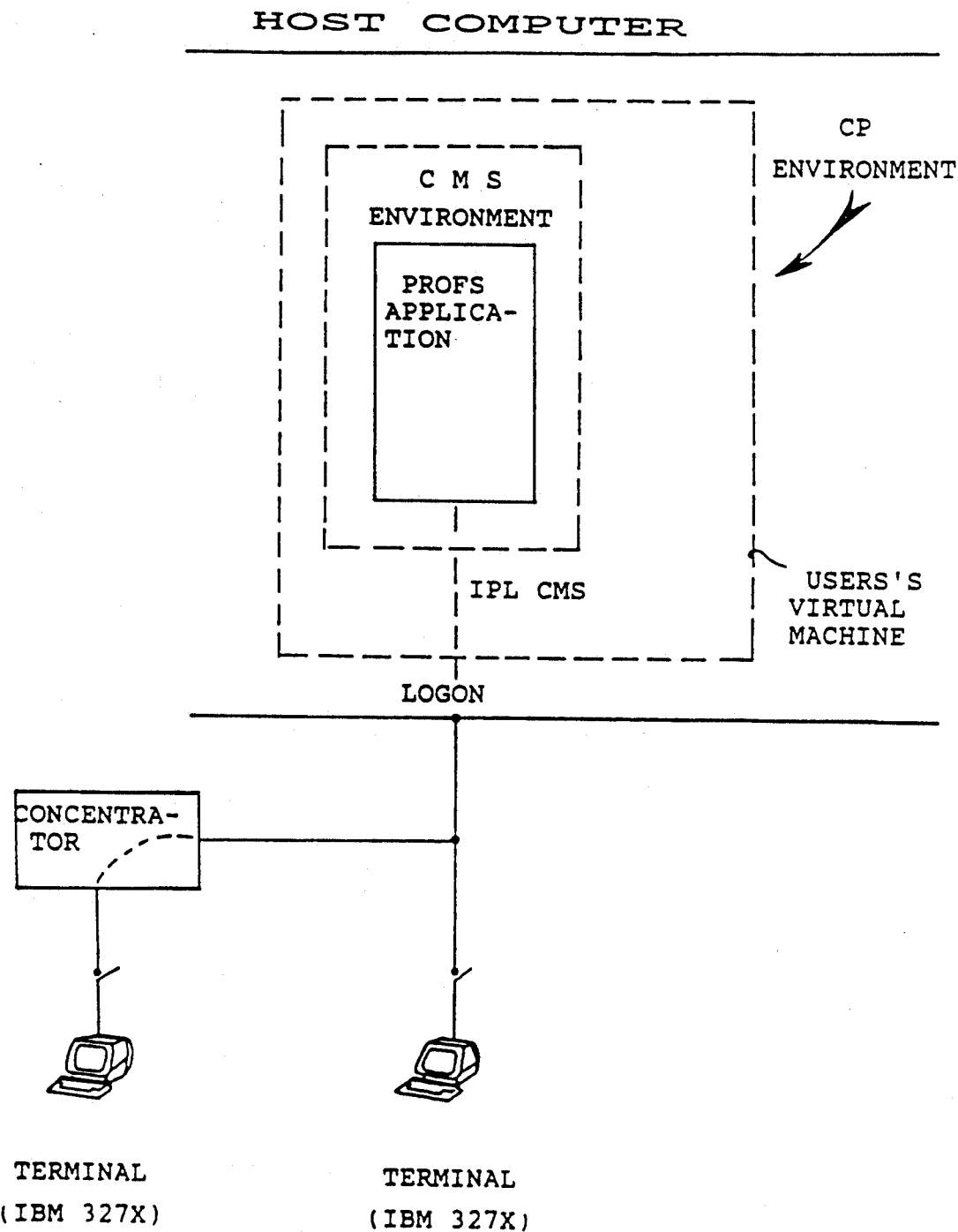
FIG. 2 shows a user's machine with hardware and software.

As illustrated in FIG. 2, a user may initiate a session using any of the terminals attached to the network, and through a log-on procedure reach his/her machine. Logging-on means sending an interrupt command from the keyboard to reach CP facilities and then identifying himself to the system by typing his identification code (userid) and in most cases a password. Then CMS resources and/or any other software resources (e.g IBM PROFS application programs) may either be accessed or request or be accessed directly. This is defined in the user's PROFILE EXEC routine tailored to identify the available resources assigned (i.e. mode available) to the specific user upon originally defining his machine. For more detailed information on PROFS one may refer to the following IBM documents:

Getting Started with the Professional Office System (Order No. SH20-5602)
Using the Professional Office System (Order No. SH20-5604)
Quick Reference to PROFS (Order No. GX20-2408)
Using Line-Mode Support with PROFS (Order No. SH20-5607)
Programmer's Guide to the Professional Office (Order No. SH20-5606)

Eventhough, the mail follow-up system of this invention applies to both received and sent mail, it will be described more particularly, hereunder, with reference to received mail. Among the resources most users may access, are text processing software to enable generating text files named with a file identification (file name) and storing these in the memory section assigned to said user or in a central memory location shared by several users. When a user (U1) needs sending a file filenamed (X) to a user (U2), mailing resources have to be accessed by (U1). Then, by attaching routing data to file (X), said file is routed toward (U2) by the system mailing facilities. U2 received file is first stored in a buffer (Reader) assigned to (U2) in his machine. (U2) may access said file and process it in several ways: display it, drop it or store it. In the latter case the file will be stored on a disk location assigned to (U2). Said disk location assigned to a user will be referred to as his (mini)disk A. As will be explained later on, the incoming mail may be filed in a named mail log, which enables classifying the disk A contents by subject matter as defined by the user. This is like storing in an assigned drawer. During the filing operation time stamping is performed which enables then sorting the mail log according to processing time. When using IBM CMS or PROFS software facilities, a command, designated by FILELIST, is called to sort the mail log contents and display it by last processing time. This command will be used by this invention to speed up and simplify the mail follow-up operations.

The follow-up system will be provided by providing each user with additional software facilities as disclosed further.

Obviously, the mail to be followed-up should neither be the dropped mail, nor the mail still buffered in the reader. This is the reason why mail tracking for the purpose of this invention will occur on data transferred from the reader buffer to storage disk A, or to a central storage. Also tracking may be made on any type of received (or sent) files, or as preferred here, on selected types of files, i.e. on VM files and so-called PROFS Notes and Documents.

Figure 3:
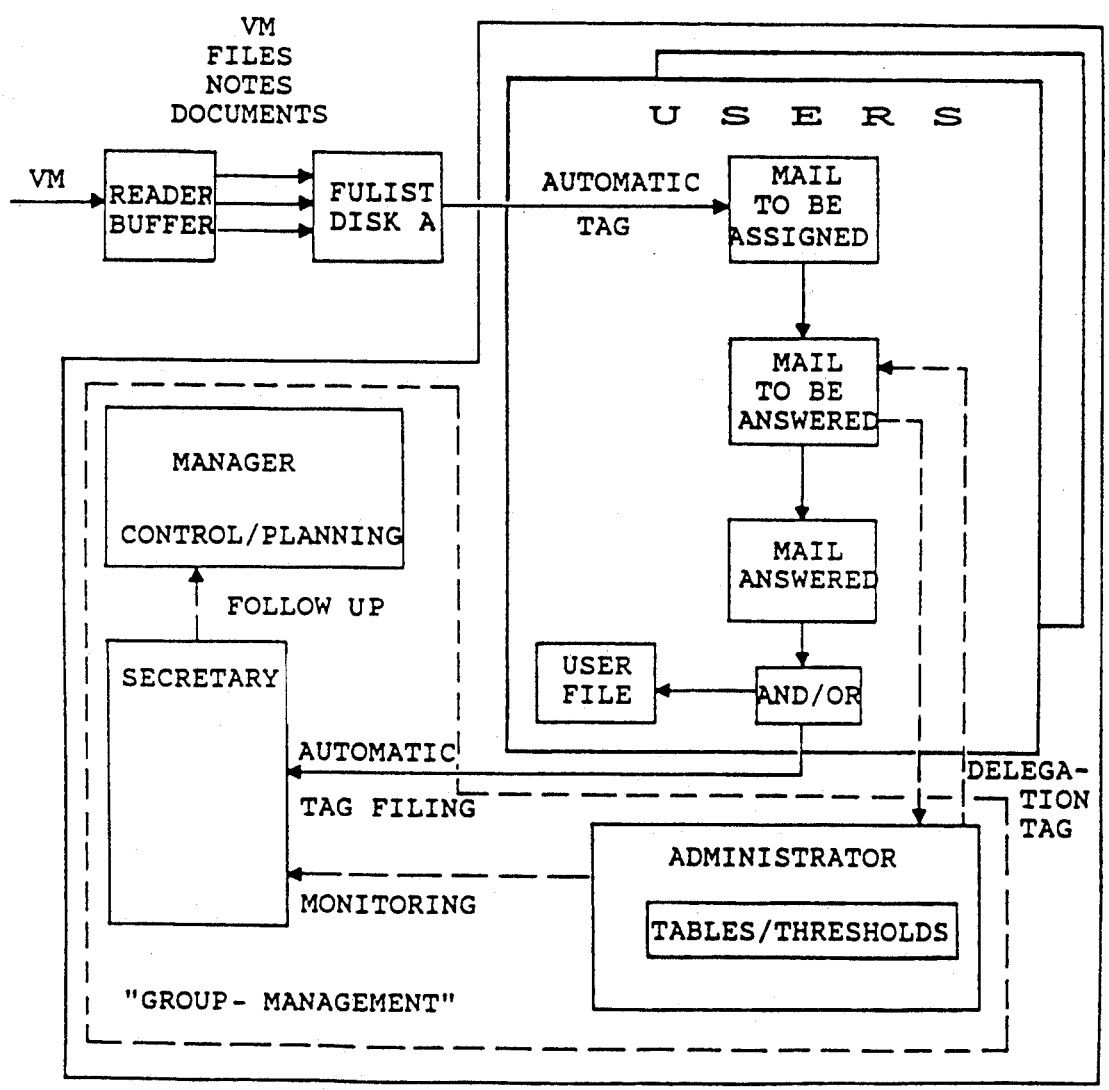
FIG. 3 is a block diagram illustrating the invention.

FIG. 3 shows a schematic representation of the follow-up organization used to handle the incoming mail. As represented in the figure, the selected mail items (i.e. VM files and PROFS Notes and Documents for present implementation) are being monitored while being transferred from the user's machine reader (buffer) to the user assigned memory zone referred to as the disk "A". Needless to repeat that this invention may be extended to other types of files without departing from the scope of this invention as disclosed in the following description.

The system to be described hereunder, automatically assigns a tag to each one of the selected files transferred from the reader. These first tags are being filed in a first storage means or "Mail To Be Assigned" file. From there mail tags could be processed by the user and then transferred into a "Mail To Be Answered" file. The mail to be answered may be processed either by the user or assigned to another user made responsible by a designated Administrator. As will be shown in more details further, the Administrator may administrate several users and process a machine made common to a group of users. For instance, the Administrator is made available a special memory section within his/her machine, memory section he/she may access on a read/write (R/W) basis while the remaining users within the group are given access (linked) to the Administrator memory on a Read only (R/O) basis. Also the Administrator may be assigned the job of installing the user's programs for the Follow-up system, arranging the group of users (listed in a table) into sub-groups, setting working parameters such as secretary assignments or operating "thresholds" (to be defined later). Subsequently, answered mail tags, or portions thereof, are transferred into a "Mail Answered" file and from there into user's file (Notelog, Mailog, etc . . .), and/or to a group secretary machine for monitoring and group history purposes to be reported to a group manager. In other words, the system may not only operate on stand alone basis, i.e. each user's mail being individually monitored and followed-on but also operate on group basis, and thus provide additional group processing functions. Needless to mention that administrator, secretary and manager may also be considered as simple users of the mail follow-up system. Also administrator, secretary and manager's control are optional.

Figure 4:
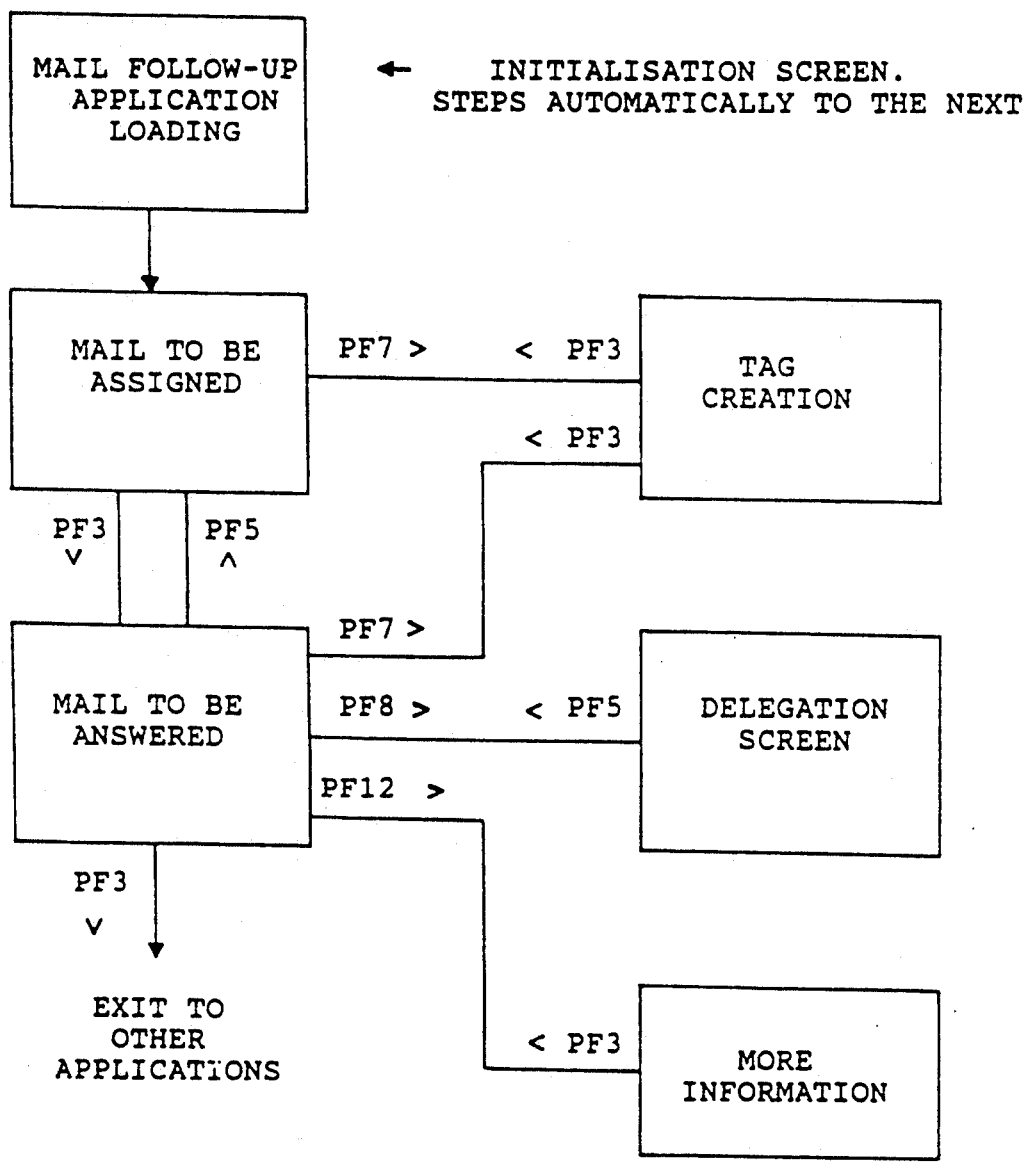
FIG. 4 is a block diagram illustrating functional keys operations while implementing the invention.

A simplified mail follow-up flow is represented in FIG. 4. The PF's references designate terminal keyboard functional keys the user may depress to switch from one display (or task) to another.

Represented hereunder is a sample tag assigned to a received mail by the system.

```
DOC NBR : 86157LAG0200   RCV DATE : 86 06 05    FROM : MILLE C.
SUBJECT : MEETING                               TGT DATE : YY MM DD
     - DOC NBR         86157          xxx       0192
                         !             !         !
                         !             !         !-- SEQUENCE NUMBER
                         !             !
                       YEAR DAY-       !
                       ( YY DDD )      !
                                       !-- xxx   User mnemonic determined
                                                 by group administrator,
                                                 of PROFS identifier
```

The above represented tag is made to include selected items or characteristic data for identifying the mail and performing adequate mail processing. For instance, the tag includes:

Document Number: made with a year and day reference (e.g. 86157 standing for the 157th day of year 86); a user mnemonic either identifying the user, or identifying the system serving said user; and finally a sequence number e.g. 0192 to be explicited further.

NB. When using IBM PROFS system the document number is already available in the requested form.

RCV DATE: date the mail was received.

FROM: identifies the sender

SUBJECT: indicates the subject: may be provided automatically by the system in view of information entered by the sender while preparing his mail.

TGT DATE is the target date for answer. Originally this tag field will indicate YY MM DD showing that year, month and day are reserved two digits each, and in that order. The user will file these fields in.

As apparent from the above definitions, some of the data are derived from the mail itself others are generated by the follow-up system.

All the above fields will be made alterable except Document Number and Receive Date.

Also, from a practical standpoint, as will become more noticeable further, specific highlightings or coloring are used to enable discriminating between alterable and non-alterable fields.

Figure 5:
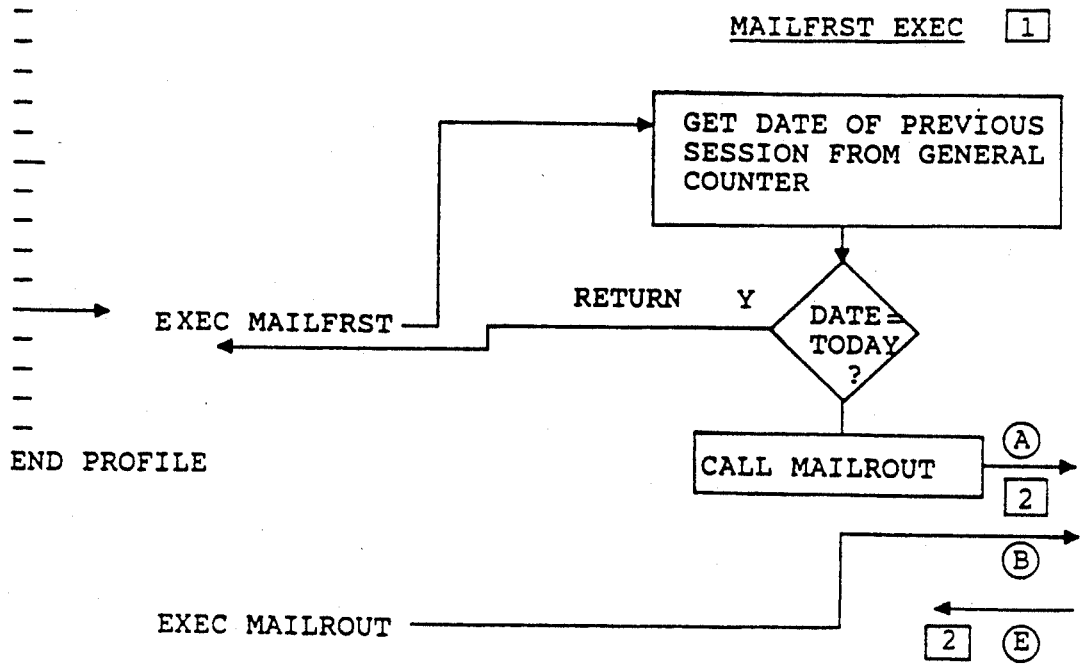
FIG. 5 is a flow-chart illustrating the invention.

Shown in FIG. 5 is a flow chart illustrating how the system is started. As represented, the mail follow-up may be initiated either automatically by inserting in the user's Profile Exec an instruction (EXEC MAILFRST) branching to the follow-up routine initiation automatically after the user logging on to his VM system-application; or on request from the user typing a specified command (MAILROUT) in CMS mode. To avoid time wasting, automatic display of tags and automatic access to the follow-up processing is limited to a preselected frequency, e.g. once a day. This is the reason why at each user log-off or exit from follow-up, the date and time is stored into a general counter ($GENCTR$ $FLUPma$ file stored in the user's assigned memory as any other file). Should the current date be equal to the general counter stored date the routine would go back to PROFILE EXEC and proceed executing this program or in other words, leave the mail follow-up application. Otherwise, the routine would go to MAILROUT and execute main router of the program.

Consequently the system needs providing means for detecting received (or transmitted) mail between two consecutive follow-up sessions. In order to reduce the search time, only the files that have been updated since the last session are scanned. For this purpose, the program uses the FILELIST command which sorts the user's stored files by updating dates. Since file "$GENCTR$ $FLUPma$" is the last updated file, said file will be on top of the Filelist at log-off. Thus upon receiving or transmitting mail, the corresponding mail logs would sit on top of the "$GENCTR$ $FLUPma$" in the Filelist. Then at next Follow-up program run, the system needs only scanning those logs on top of "$GENCTR$ $FLUPma$". This is illustrated in FIG. 6. FIG. 6a shows a display of the Filelist at the end of a first follow-up session. It includes several logs named "TOTO NETLOG", "NOTE OFSLOGfl", "NOTEBOOK ALL" and "$GENCTR$ $FLUPma$" respectively, with "$GENCTR$ $FLUPma$" sitting on top of the Filelist. Then, assuming the network is being operated and mail stored first in Log "NOTEBOOK ALL", then in Log "TOTO NETLOG", without the Follow-up program being run, the considered logs would appear in the Filelist as represented in FIG. 6b. Should Follow-up program be run either automatically (the next day), or upon the user's request (by typing a command "MAILROUT" from a terminal keyboard), then the Filelist would end as represented in FIG. 6c, i.e. back with "$GENCTR$ $FLUPma$" on top of the Filelist.

Figure 7:
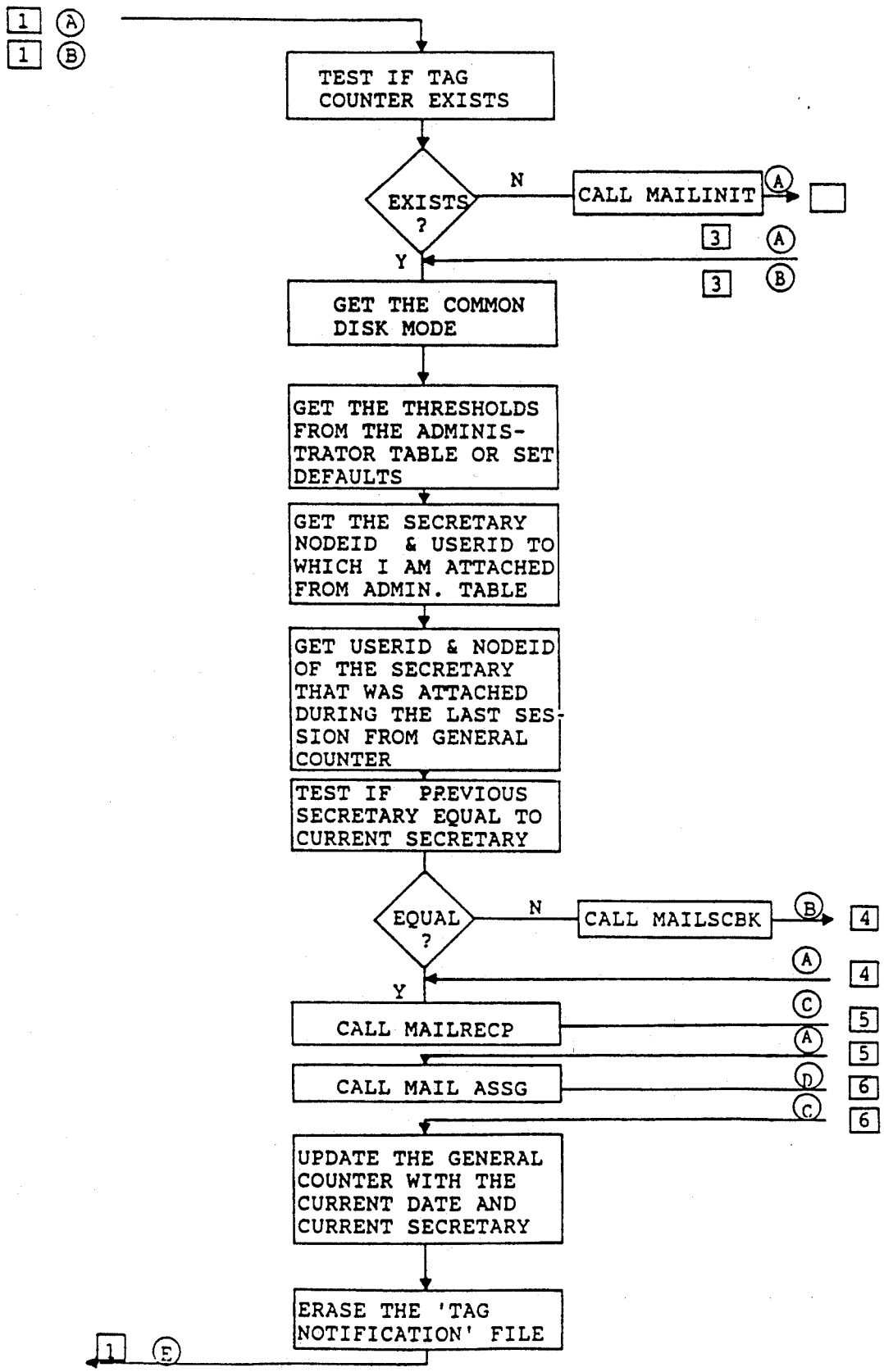

Represented in FIG. 7 is the flow chart for the main router program (MAILROUT EXEC) which will call successively three main routines:

MAIL RECP which attaches tags to new incoming mail.

MAIL ASSG which manages a "To Be Assigned" panel.

MAILANSW which manages a "To Be Answered" panel.

Each tag attached to a mail file is assigned a reference number (see DOC NBR in FIG. 4) which should be unique. The uniqueness is more particularly important when operating in group mode as will be disclosed later on. The document number format is as follows: YYDDDMNESSSS, where YY=year; DDD=day of the year; MNE=3 digit Mnemonic and SSSS=sequence number.

For stand alone mode, the default mnemonics are:

MNE=VMF for VM file.

MNE=VMN for VM note.

MNE=PFN for PROFS note.

MNE=PFD for PROFS document.

The last sequence number is maintained in a file, or tag counter "$$CNTR$$ $FLUPma$". In order to keep the uniqueness of the document number, one cannot afford to lose this sequence number. Therefore, if this file is accidentally erased a recovery procedure is entered in order to reconstruct the file with the last sequence number. (A similar procedure (CALL MAILINIT) is also initiated at first use by a new end user being attached to the follow-up system).

The above operations on MAILROUT are represented in the flow-chart of FIG. 7 wherein the system starts with checking for the existence of tag counter file $$CNTR$$ $FLUPma$. Should this counter be absent, call MAILINIT routine is being entered in, to recover the tag counter if it has been lost, or set up first time use otherwise; and then return back to MAILROUT EXEC. The routine MAILINIT (see FIG. 8) is called when the tag counter does not exist, either to recover it if it has been accidentally lost or to update all the existing files at first time use of the follow-up system.

The tag counter is first set to zero. Then the system scans all stored files (VM files, VM notes, PROFS documents and PROFS note files) to detect any existing mailrout flag (see FIG. 11). The tag counter is then updated to the highest detected flag value. The tag counter contents is tested. If the tag counter contents is zero, all stored files are flagged to simplify any subsequent flag test but no tag is created and the tag counter is updated prior to branching back to MAILROUT EXEC. Should on the contrary, the tag counter be different from zero, MAILINIT routine would then return to MAILROUT EXEC directly.

MAILROUT EXEC then branches to operating steps for a system involving a preassigned Administrator AND/OR Secretary processing for group follow-up management. For that purpose, a common disk mode of operation has been defined. The system gets therefrom parameters such as thresholds (to be defined) from a pre-stored Administrator table; references (node and userid) of the secretary assigned to the considered user, as well as references of the secretary assigned to same user at previous Mailrout run, to check for any secretarial reassignment. Should the secretary reference have changed, then a secretary back-up procedure (MAILSCBK) is initiated.

Figure 9:
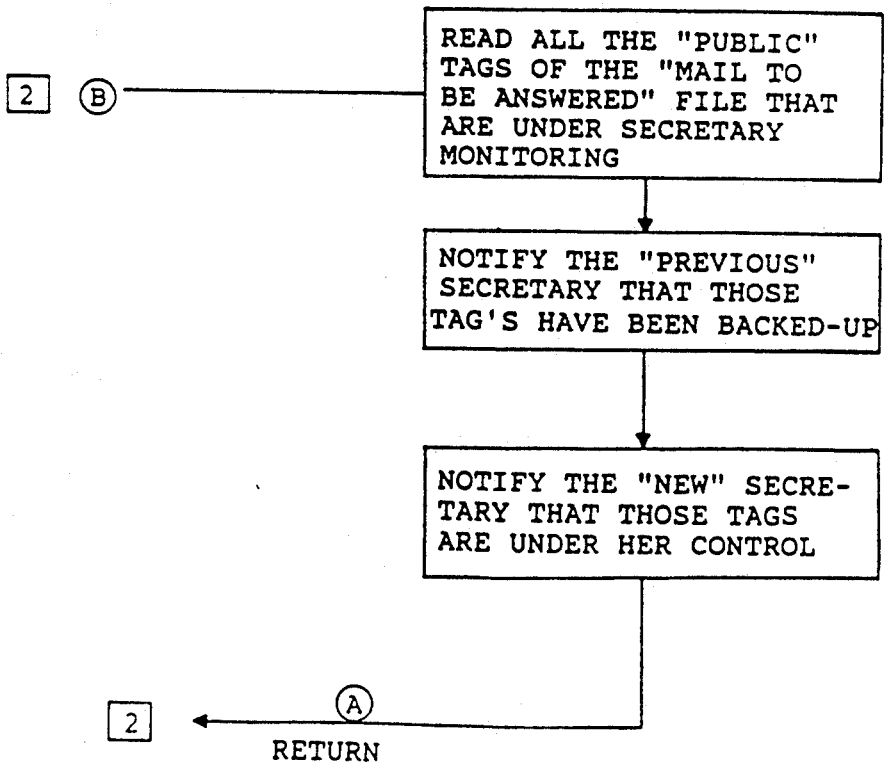

This back-up procedure is illustrated in the flow chart of FIG. 9. The MAILSCBK EXEC starts checking flags assigned to the tags to discriminate between personal files whose tags have been assigned a personal "P" flag by the mail destination user, from tags being assigned an "S" (secretary"). S flags are assigned by default. Then those "S" flagged mail (in other words Public Tagged mail) to be answered, are monitored. If a secretary change occurred, the previous secretary as well as newly assigned secretary are notified.

The routine branches then, back the MAILROUT EXEC to process the receiving mail routine, i.e. call MAILRECP routine, of FIG. 10. The monitored received mail may include delegation tags, i.e. tags assigned by the follow-up administrator based on delegation criteria to be explained further. These tags need only be filed. The remaining files are scanned for all files belonging to the types to be considered (i.e. in VM or PROFS) and above the general counter in the FILELIST. This precaution enables limiting the mail processing to newly received mail. Each newly received mail (not flagged as will be explained later) is being prepared a tag by a repetitive routine which ends either with the last file received or to be processed through the delegation procedure. The process scans for last file. As long as last file is not processed, the last sequence number is fetched in the tag counter and incremented by 1 to generate the SSSS tag number reference. Then the new flag is constructed by getting the information from the processed file, i.e. originator name (FROM); subject; originating date (RCV date) and originator references (nodeid and userid). The mail originator is checked to generate and attach either an "S" flag for sent mail or "R" flag for received mail, in an unused part of the considered file.

Figure 11A:
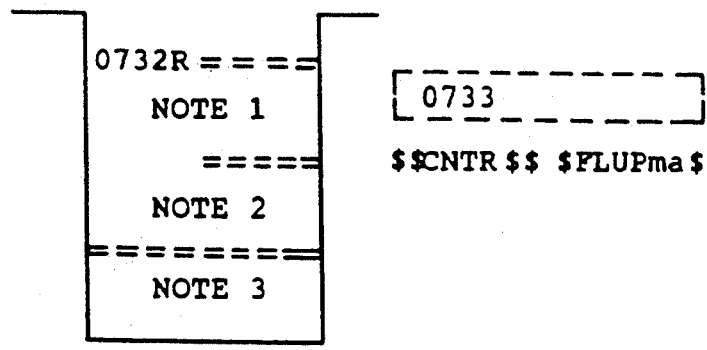
FIG. 11 illustrates a filing facility.
Figure 11B:
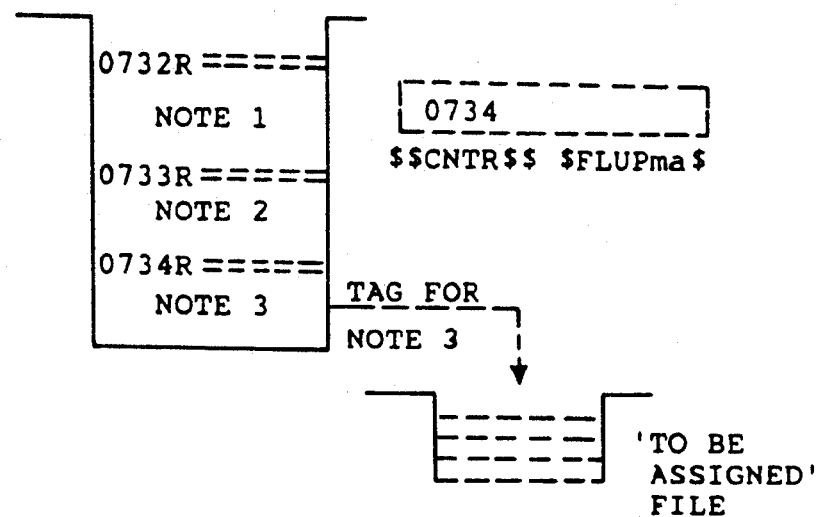

FIG. 11 illustrates the above flagging operation as applied to VM Notes. VM Notes are received (stored) in files whose file type is "Notebook". When displayed on the terminal each Note is separated from next one by separators (= = =) inserted by the system. The above mentioned sequence number is inserted on the separators line. As represented, Note 1 and Note 2 have been already processed and they have respectively been assigned sequence numbers 0732R and 0733R. Note 3 has been received since the last mail follow-up session and is not yet processed on FIG. 11a. $$CNTR$$ $FLUPma$ contains the highest sequence number 0733. Once Note 3 is processed (FIG. 11b) it is assigned sequence number 0734 and flagged with 0734R. The corresponding tag is added to the "To Be Assigned" file. The sequence counter is incremented to 0734.

In other words, MAILRECP EXEC performs the following operations:

(1) Scan the files wherein the sent/received mail is logged, i.e. belonging to one of the following types:
"xxxxxx NOTEBOOK" for the VM Notes.
"xxxxxx OFSLOGfl" for the PROFS Notes.
"xxxxxx NETLOG" for the VM Files.
"OFSINDEX OFSDATA" for the PROFS Documents.

(2) If new received/sent mail is detected (no flagged) a tag is constructed with the pertinent information gathered from said files;

(3) A flag (made of the sequence number followed by an S for sent mail or an R for received mail) is inserted in an unused field of the considered file (see FIG. 10);

(4) The last sequence number in "$$CNTR$$ $FLUPma$" is updated.

(5) The tag is put in the "To Be Assigned" file.

To minimize processing time for flag setting and follow-up operation from one follow-up session to the next, only those Log files which have been updated, i.e. have received new mail, are to be considered. For that purpose, the follow-up system takes advantage of the fact that the FILELIST command sorts the files by updated dates. Since the general counter file $GENCTR$ $FLUPma$ is the last updated file of the follow-up session, it should then stand on top of FILELIST. At next follow-up session, unprocessed files will sit on top of $GENCTR$ $FLUPma$. This enables the system identifying the only files to be considered, i.e. the files not already followed-up.

Therefore, the system identifies both the logs to be processed and within each log, the unprocessed files.

Figure 10A:
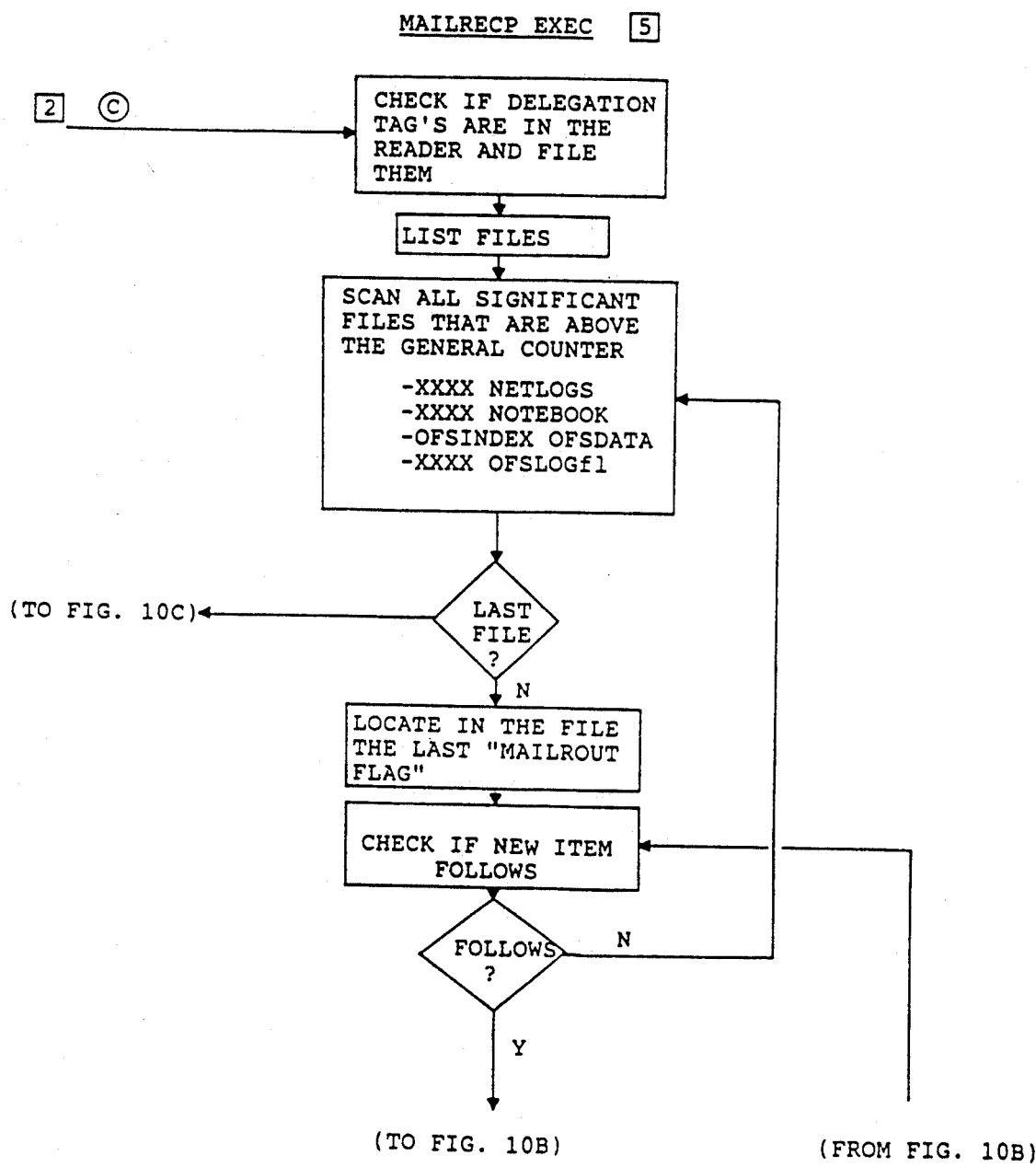

As shown in FIG. 10 (including FIGS. 10A, 10B and 10C), once last conventionally received mail has been assigned a tag, specially assigned mail (e.g. through delegation) will be tagged. Each file assigned a delegation flag is considered and if not already flagged, it is flagged. Finally, the system returns to MAILROUT EXEC to call for the "To Be Assigned" (MAILASSG EXEC).

Once the follow-up routine assigning the tags is run, the system automatically displays a "MAIL TO BE ASSIGNED" screen. Said screen displays several tags (5 in the hardcopy of screen represented hereunder). Each tag includes alterable fields (e.g. target date TGT) upon which the user may write, and non alterable fields (e.g. RCV date, or DOC NBR). Different colors have been used to discriminate between alterable and non alterable fields. Also, functional keys (PF Keys) have been customized to enable the operator processing the tags as well as the corresponding files. As will be apparent from subsequent description, the PF keys customizing may be organized at will by the programmer setting the various routines of the follow-up system.

| *0 | June 06,1986 | ** MAIL TO BE ASSIGNED ** | Friday D157 W23 ** | |
| --- | --- | --- | --- | --- |
| *1 | DOC NBR: 86156LAG0192 SUBJECT: MEETING NOTICE | RCV DATE: 86 06 06 | FROM: MILLE C. TGT DATE: YY MM DD | S |
| *2 | | MAIL 86147LAG0192 APPENDED TO THE << TO-BE-ANSWERED >> FILE | | |
| *1 | DOC NBR: 86156LAG0200 SUBJEC: MEETING | RCV DATE: 86 06 05 | FROM: MILLE C. TGT DATE: YY MM DD | S |
| *1 | DOC NBR: 86157PFN0180 SUBJECT: CHECK POINT | RCV DATE: 86 06 05 | FROM: MILLE C. TGT DATE: YY MM DD | S ↓ |
| *3 | | MAIL 86209CVZ0384 MAIL TAG DISCARDED | | * 5 |

| *4 | PF3=>QUIT PF4=>DELETE | PF6=>EDIT PF7=>CREATE | PF9=>PRINT |
|---|---|---|---|
| | PF10=>FWRD PF11=>BKWRD | | |

Several characteristics of the system have been illustrated in the above screen hardcopy. They are identified with a flagged number to enable explaining them.
* 0 shows that the upper portion of the screen displays inter alia, the mail processing date as well as Day and Week annual reference numbers, e.g. D157 W 23 for 157th day and 23rd week of the year.
* 1 shows a mail tag for a document awaiting processing.
* 2 shows a mail tag when a target date has just been assigned and the corresponding tag transferred into the "To Be Answered" file.
* 3 shows a mail tag just discarded by the user. As apparent from the PF designation, deletion is operated by pointing the cursor in one of the tag fields and depressing PF4 (or by forcing a "D" onto first "Y" of the TGT DATE).

It should be noted, that only the mail tag is deleted not the associated mail. This feature enables clearing the tagged mail to keep only selected mail to be followed-up.
* 4 shows the PF keys designations. It is self-explanatory.
* 5 shows the secretary assigning flag. This flag is either set to S (by default) or to P. A tag with S goes to secretary for monitoring: A tag with P designates a private file not to be monitored by a secretary. "S" flagged tags will also be referred to as "public tags", from the secretary side.

Figure 12B:
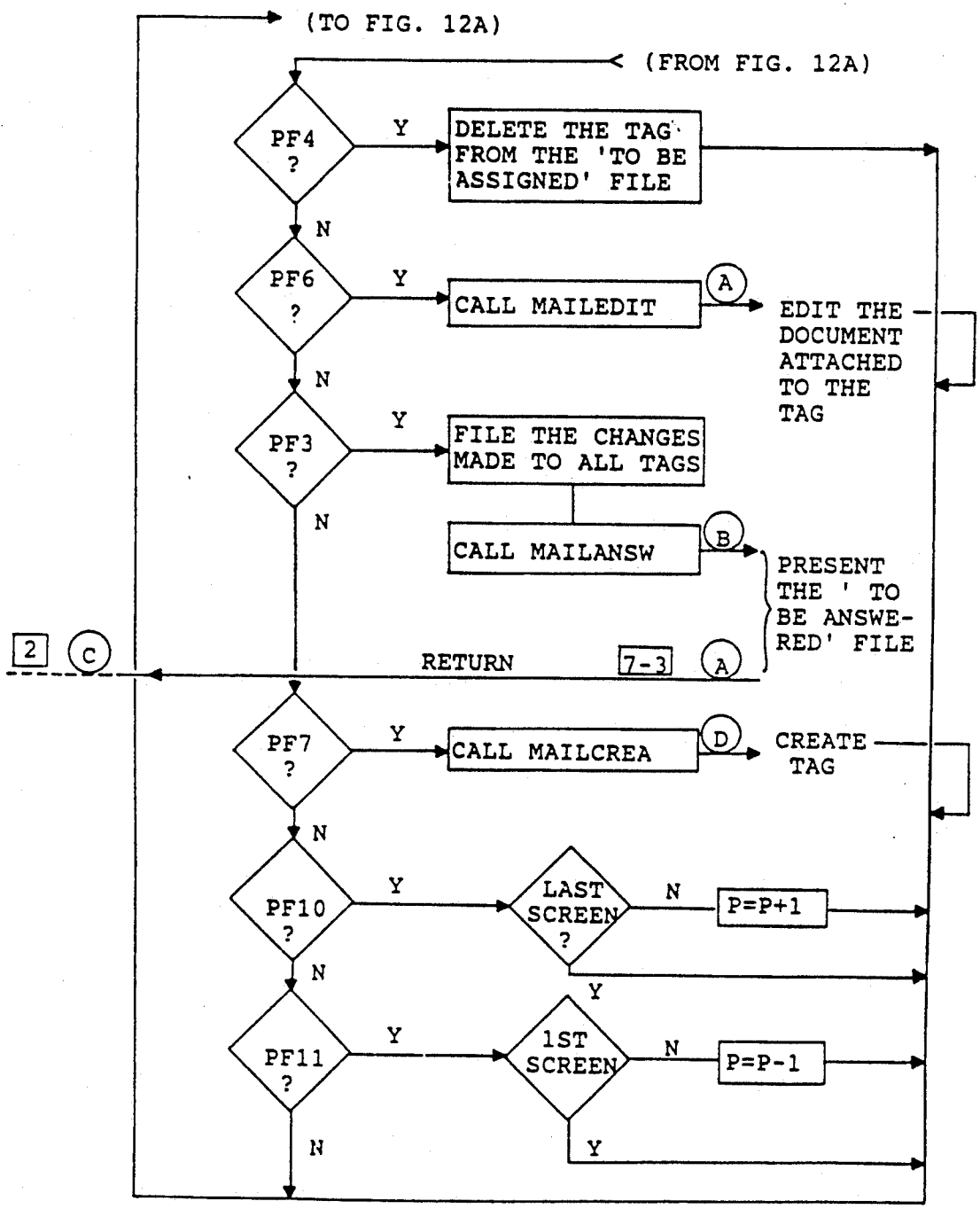
Figure 13A:
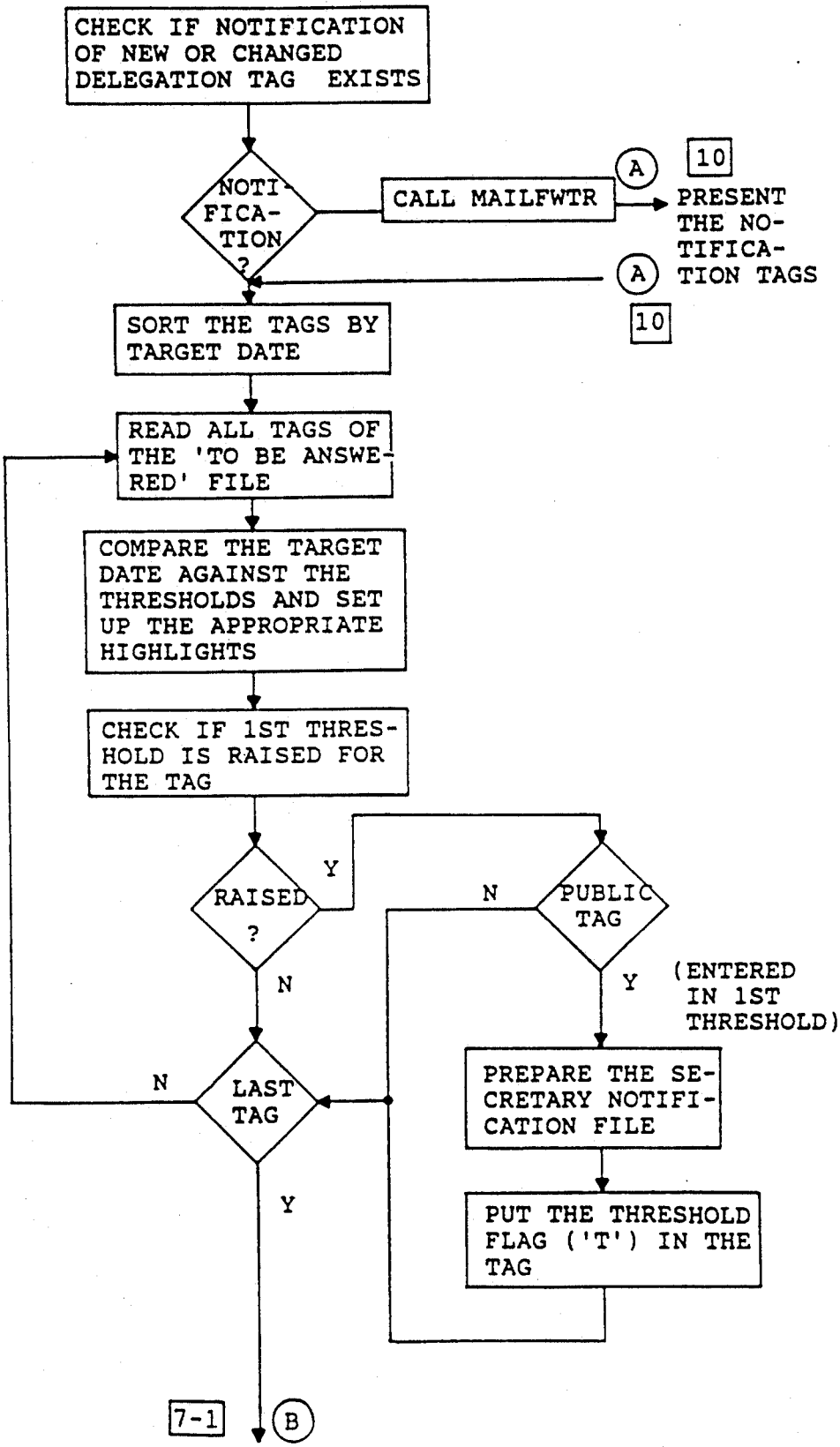

The above operations are controlled by running the MAILASSG EXEC of FIG. 12 (including FIGS. 12A and 12B).

The tags are to be displayed on the screen by page (p) starting with p=1. Once the tags are displayed, the user may select a tag or a selectable field within a tag using the cursor in a conventional manner, e.g. using the keyboard, tab control keys or the cursor control keys. This action is monitored by the system and considered as a "user response".

After each response, the tags are scanned and target date are checked for updating and for tags to be deleted. For target date including a numeral value (a D inserted as first data digit means delete), validity is checked. Invalid dates, e.g. MM>12, trigger an error message, to get corrections from the user, when PF3 is depressed to QUIT. Once data validity is checked, the tag is transferred into the "To Be Answered" file and deleted from the "To Be Assigned" file.

The customized functional keys are scanned for testing depletion. Obviously the functional keys may be customized as required by the follow-up system users needs. For the presently achieved implementation of the Mail to Be Assigned routine, the PF keys have been assigned the following functions:

| PF4 = delete | to delete the tag from the "To Be Assigned" file. |
|---|---|
| PF6 = call Mail Edit | branches to a routine fetching the document attached to the tag and displaying it. |
| PF3 = quit | file the changes made by the |
| | user to each tag and switch the follow-up system to the "To Be Answered" routine. In other words, quits the To Be Assigned routine. |
| PF7 = create | branches to a routine for creating tags at will. This routine displays a blank tag for adding tag reminders for any mail not received through the electronic mail monitored and tracked by the follow-up system. |
| PF10 and PF11 | enable scrolling the "To Be Assigned" file, forward and backward respectively. |

Upon depressing PF3 while MAILASSG EXEC is being run, the system branches to MAILANSW EXEC for processing mail to be answered (See FIGS. 13A-D, with 13C including C1 and C2).

Figure 14:
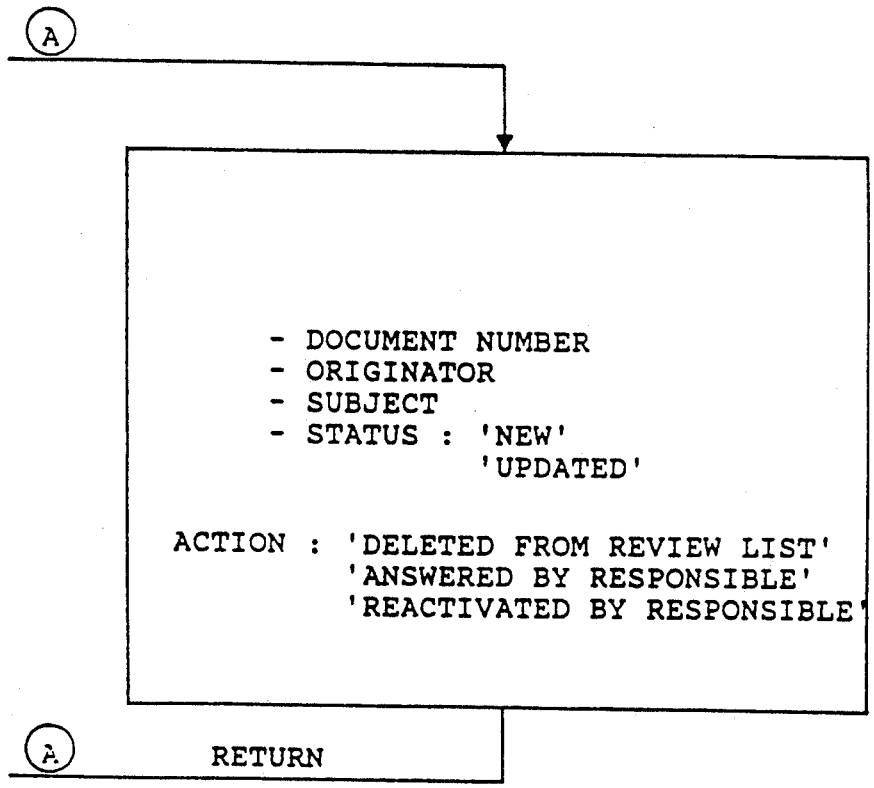

By running MAILANSW EXEC the system first checks for notifications of new or changed delegation tags. In case of positive check, the system branches to MAILFWTR EXEC (see FIG. 14) to present delegation tags. Delegation tags, are tags generated not on conventionally monitored received mail, but rather on jobs assigned through a delegation procedure, either by one of the average system users or by the administrator. These tags thus attach to transferred jobs. The MAILFWTR EXEC (FIG. 14) presents the delegation tags that are new or updated. Those information are extracted from a follow-up file designated as "Tag Notification" file "$FWTRK$ $FLUPma$" created by the system and updated by MAILRECP EXEC. Going back to MAILANSW EXEC (FIG. 13A) first the tags are sorted by target date and sequentially read out, and displayed with special highlighting based on predefined thresholds of delays with respect to the target dates. For instance:

1) If target date < 1st threshold:
FIELD1=DOC NBR set blue.
FIELD2=RCV DATE blue.
FIELD3=TGT DATE green.
FIELD4=ANSWR DATE green.
2) If 1st threshold<TGT DATE<2nd threshold :
Same as above except that Field 2 content is made to include "* TARGET −X *" with X being the number of remaining days up to target. This field is colored white.
3) If TGT DATE=≧2nd threshold:
Same as (2) but with different colors:
FIELD1=white.
FIELD2=white.
FIELD3=red.
FIELD4=red.

Then tag checking versus first threshold starts. If first threshold is reached and the tag considered is not a private tag, the secretary is notified. These operations are performed down to last tag. For each file wherein the first threshold has been reached, a "T" flag (threshold flag) is loaded in a tag threshold flag field to trigger monitoring. The tags are displayed starting with page 1 of tags (see FIGS. 13B-13C). User may update (or not) any of the displayed tags. As represented in FIG. 13C, (note that this figure has been split into 13C1 and 13C2), if the considered tag has been updated check if the ANSWER date starts with a "D" (for delete). If this is the case then, the tag is written in the "Has Been Answered" file to stop following that mail up. If the answer is negative (i.e. no "D" tag), a date validity check is operated. If the date is invalid a message is displayed, calling the user for correcting the date. PF3 is tested for depression. If not depressed, the date validity check proceeds to next tag, otherwise answer date is set to "YY MM DD". For a validly checked tag, the tag is written in the "Has Been Answered" file. Then come two consecutive tests. First test checks whether the user is responsible for the answering. If yes, then a delegation changes notifier routine (MAILFWTG EXEC) (see FIG. 15) is called; otherwise publicity of tag is checked and if not public, the tag is simply deleted from the "To Be Answered" file. If the tag is public, then a notification tag is prepared for the secretary with a "D" flag for deleted tag or an "A" flag for answered. A check for possible delegation list attached to the considered flag is operated. If this is the case, a secretary delegation notification is prepared prior to deleting the tag from "To Be Answered" file; otherwise deletion is operated right away. These operations are performed down to the last tag.

Assuming Answer Date was not updated, a check for target date change is performed. If not changed, tag scanning goes to next tag. If the target date has been changed, a check for target date validity is performed. If not valid, an error message is displayed inviting the user to enter a corrected date. Then, once PF3 is depressed target date is reset. If the target date was found valid, a check for target date lower than first threshold and threshold flag="T", leads to flag set to F. Indeed, when first threshold is reached, for a public tag, a "T" flag is inserted in a threshold flag field. Said "T" enables signalling that the considered tag, entered a survey zone and the secretary was notified.

Then "check if target date < threshold AND threshold flag="T"", means: should this test be positive, the tag entered the survey zone, the secretary was notified, but, the target date has been postponed to leave the survey zone. The secretary needs thus be notified with a "delayed" flag.

Therefore, in both instances where either the answer date was updated or the target date was changed the tag is being taken care of directly and then the system looks for any delegation order assigned to the considered tag (i.e. its associated file). For that purpose, the system branches to the delegation changes notifier routine (MAILFWTG EXEC) (see FIG. 15).

To understand the rationale of this feature, some additional information may be useful. Whenever one of the follow-up system users receives a mail, he/she may decide to delegate the responsibility of the answer to another user within a predefined review list of users, along with designating one or more reviewers for comments. The delegation facility is accessible through PF8 (forward responsibility) in the Mail To Be Answered screen, as will be explained later on. Once the choices are set, they enter a delegation history file.

Consequently upon running MAILANSWR EXEC once the MAILFWTG routine is called, the system performs, the following operations (see FIG. 15):
find and review list in delegation history file;
construct a "delegation notification" file;
send "delegation notification" file to the deleguees (responsible or reviewer).

Figure 15:
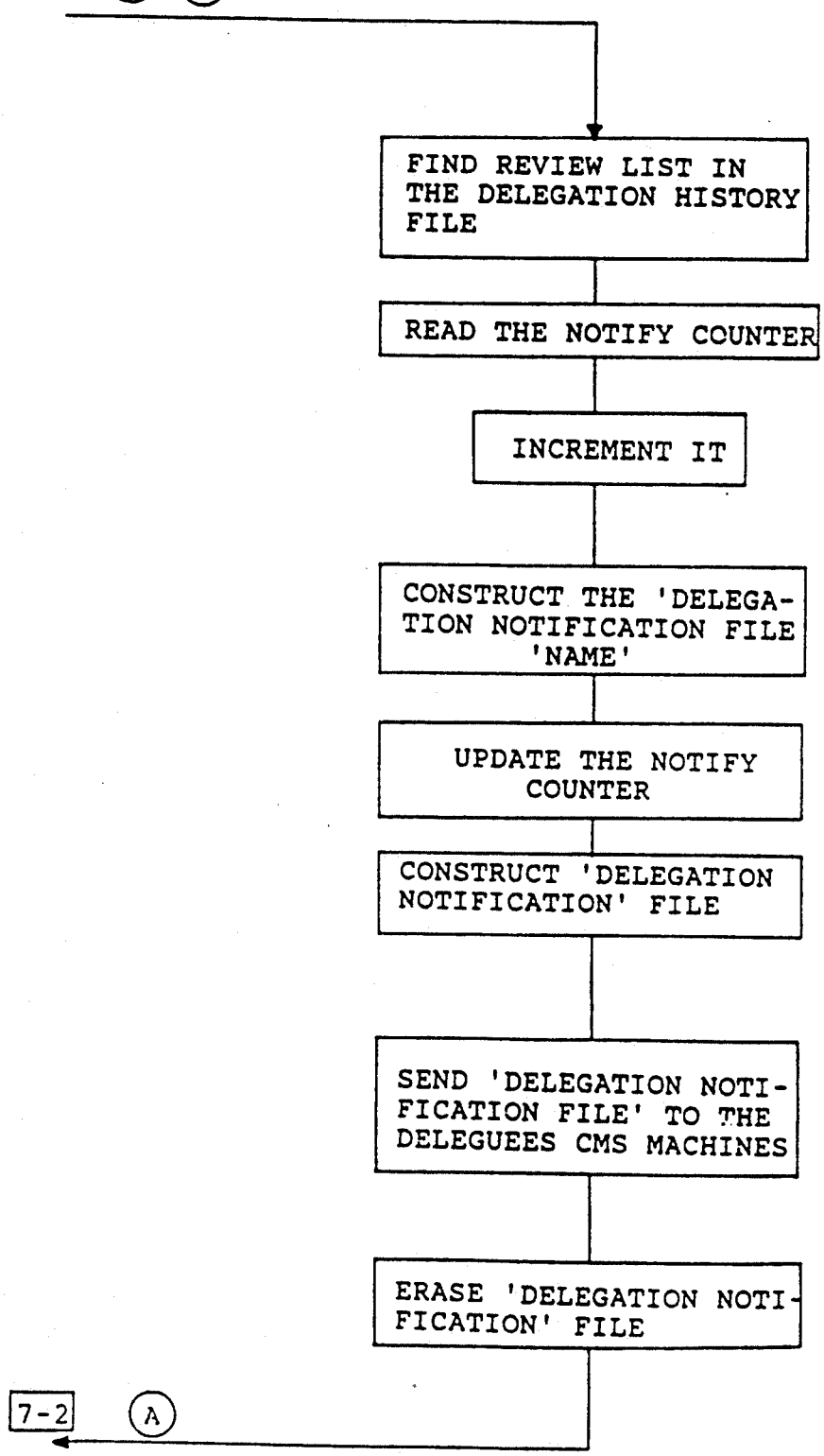

As represented in FIG. 15 counters may be used and loaded or incremented upon delegation processing for statistical and control/planning purposes.

MAILANSWR EXEC also provides customized functional keys distributed into two menus with PF2 switching from menu 1 to menu 2 and PF1 switching back to menu 1 (see FIG. 13B). In both menus, depressing PF3 branches to a "quit" routine as will be explained later on with reference to FIG. 13B. Functions of remaining keys are organized as follows:

(1) In Menu 1:
PF5: calls MAILASSG EXEC and switches back to screen "Mail To Be Assigned".
PF6: calls a MAILEDIT routine enabling editing the file attached to the tag, which in practice is particularly useful. This routine just gets the mail text and displays it.
PF7: calls a MAILCREA EXEC for creating a tag (to be disclosed with reference to FIG. 16). This is particularly useful to enter any telephone call or paper message data into the follow-up system. In other words for extending the Follow-up system to non-electronic mail.
PF8: calls MAILFWRD EXEC (see FIG. 17 including 17A and 17B), for presenting the delegation menu.

The delegation function was already mentioned in connection with MAILFWTG EXEC. More particularly, in present application, four delegation levels have been made available to the user:
(a) Addressee (A); he is really the addressee of the considered mail and may: input the target date; modify the Selection Flag; and assign Responsible and Reviewer(s).
(b) Responsible (B): he is the person requested to provide the mail answer and inputting the answer date. He may designate a new responsible; alter the list of reviewers and modify the target date.
(c) Reviewer (C): person(s) requested to review/comment the mail.

A delegation Flag (A, B, C or D) is automatically attached to the corresponding Tag. The delegation procedure will be described in details in connections with FIGS. 17.

PF10 and 11 are used for scrolling "Mail To Be Answered" screen, forward and backward respectively.
PF12=calls a MAILMORI EXEC presenting a menu to add and view more information to the pointed tag.

(2) In Menu 2:
PF1=switches back to menu 1.
PF2=calls a routine MAILSRCH EXEC for searching in the answered files.

Finally, in both Menu 1 and Menu 2, PF3 is a QUIT key. Depressing said key enables quitting the follow-up system after several operations are performed (see FIG. 13D).

Upon quitting the follow-up, target dates relative to Answered or To Be Answered mail have first to be updated. This means computation and writing for display of any delay remaining for processing the mail attached to each flag. In parallel with these operations, any secretary assigned for monitoring, should be automatically advised.

First, if the tag was under secretary monitoring and has been changed to private, then the secretary is notified that the corresponding mail has been privated. Assuming the corresponding mail was with a threshold flag, said flag is accordingly erased.

Subsequent test is operated over delay flag to enable notifying the secretary that mail processing was delayed and reset the threshold flag.

The above operations are repeated over all tags in the "To Be Answered" file to enable then modifying the tags accordingly, sending the secretary notification files or erasing secretary notification files. The routine then branches back to MAILROUT EXEC to update the general counter with the current date and current secretary and erase the tag notification file and finally Quit the application. The "Mail To Be Answered" panel, finally looks as follows:

calling MAILCREA EXEC displays a tag template with already filled-in fields and fields to be filled-in, as shown in the hardcopy of screen represented hereunder.

```
                        * ACTIVITY/MAIL *
                        * TAG CREATION *
DOC NBR: 86061TUB1756  RCVD: 88 03 01      FROM: TUBIANA
SUBJECT: External document creation        TGT DATE: YY MM DD S
        FILL IN THE REQUIRED FIELDS THEN ENTER TO CONTINUE
                    If the Target date is filled in:
                 the tag will show on the TO-BE-ANSWERED screen
                                If not:
                 the tag will show on the TO-BE-ASSIGNED screen
PF3==> QUIT
```

The already filled-in fields include a DOC NBR set by the sequential counter and predesigned for the user. For instance 88061TUB1756 standing for the 61st day of 1288 (current date), TUB for the user's ID mnemonics and 1756 as sequence number. Also, filled-in field includes the current date as RCV DATE. None of these could be modified. The originator field (FROM) comes filled in with the user's name but is alterable at will from the keyboard. The SUBJECT field is made to include a message e.g. "External document creation" inviting the user to enter a subject. As per the TGT DATE it first includes YYaMMaDD. If the target date is filled in, the tag will show on the "To Be Answered" screen; other-

```
June 06, 1986              ** MAIL TO BE ANSWERED **   Friday D157 W23 **
*1  DOC NBR: 86156LAG0206 ** TARGET+2 **TRGT: 86 06 04 ANSWR YY MM DD           S
    SUBJECT: MEETING NOTICE                                  FROM: MOURIER Y.
*2  DOC NBR: 86156LAG0251 ** TARGET+2 **TRGT: 86 06 01 ANSWR YY MM DD           S
    SUBJECT: CHECK POINT                                     FROM: MILLE C.
                                                                             *  3
    DOC NBR: 86119PFN0104 RCVD: 86 06 06TRGT: 86 06 01 ANSWR YY MM DD
    SUBJECT: MEETING                                         FROM: MILLE C.   S  B
                                                                             *  4
                            MAIL 86147LAG0192
                                ANSWERED
    DOC NBR: 86209VNZ0111 RCDV: 860605 TRGT: 86 06 01 ANSWR YY MM DD
    SUBJECT: ACTIVITY PLANNING                               FROM: MILLE C.   P  C
                                                                              ↓  ↓
                                                                             *5
                                                                                *6

PF2=>MEN2 PF8=>QUIT PF4=>DELETE PF5=>TBASS PF6=>EDIT PF7=>CREATE
PF8=>FWDRSP PF9=>PRINT PF10=>FWRD PF11=>BKWRD PF12=>MORINF  Page 1 of 1
```

The indexes *1 through *6 are only used here to point out and explain the specific features offered by the considered routines.

- *1 shows an highlighted overdue target (+2 meaning :2 days past the target as might be checked by comparing the current date appearing in the upper left hand corner of the screen, to the TRGT of first tag).
- *2 the highlighting emphasizes a reached threshold (5 days before target), calling that tag to user's attention. Will be decremented each day.
- *3 mail not answered, and threshold not reached yet.
- *4 answered mail. Answer date just entered into the system.
- *5 mail assigned a personal selection flag (not reported to secretary).
- *6 delegation flag.

Figure 16:
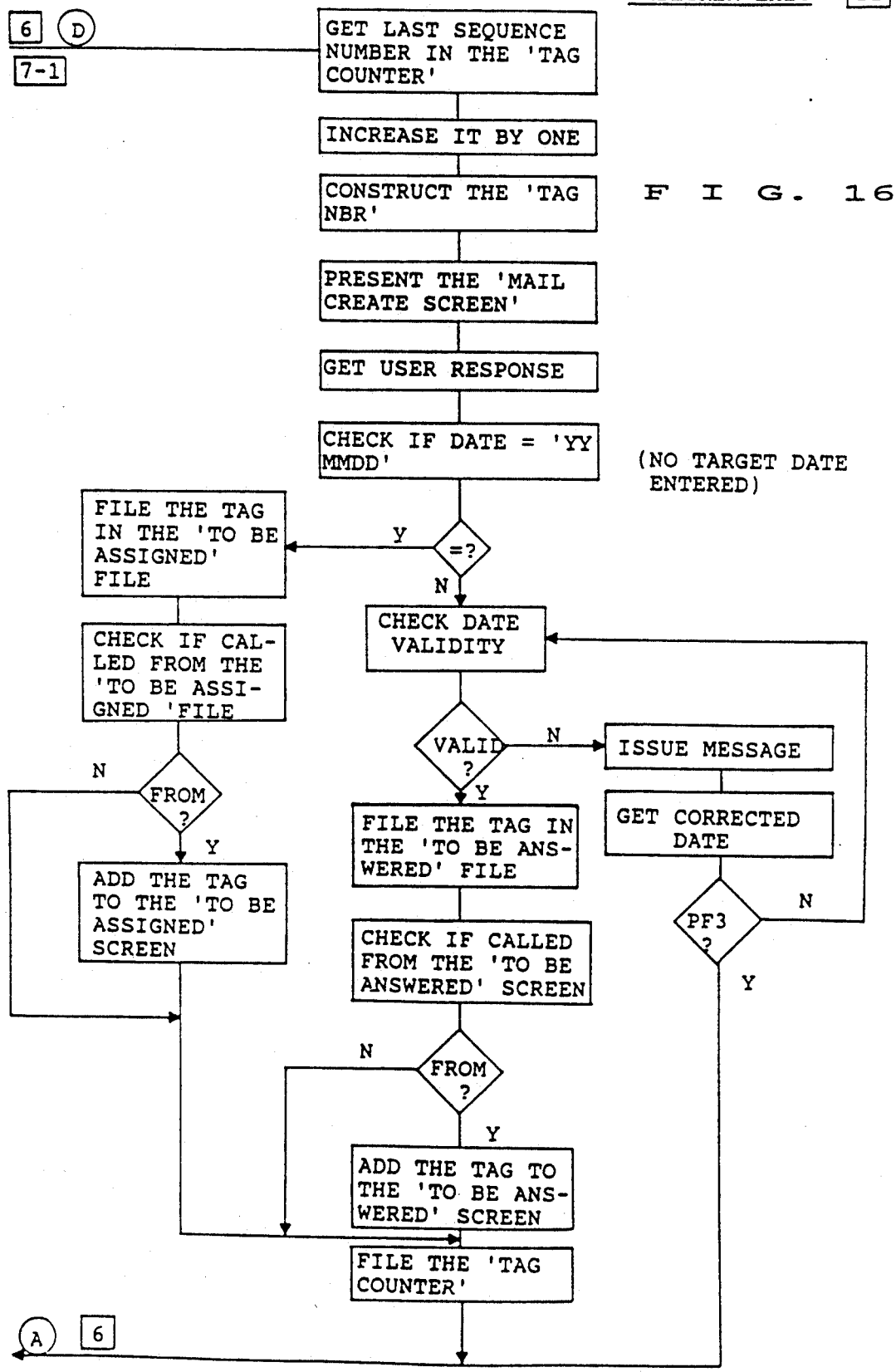
Figure 17A:
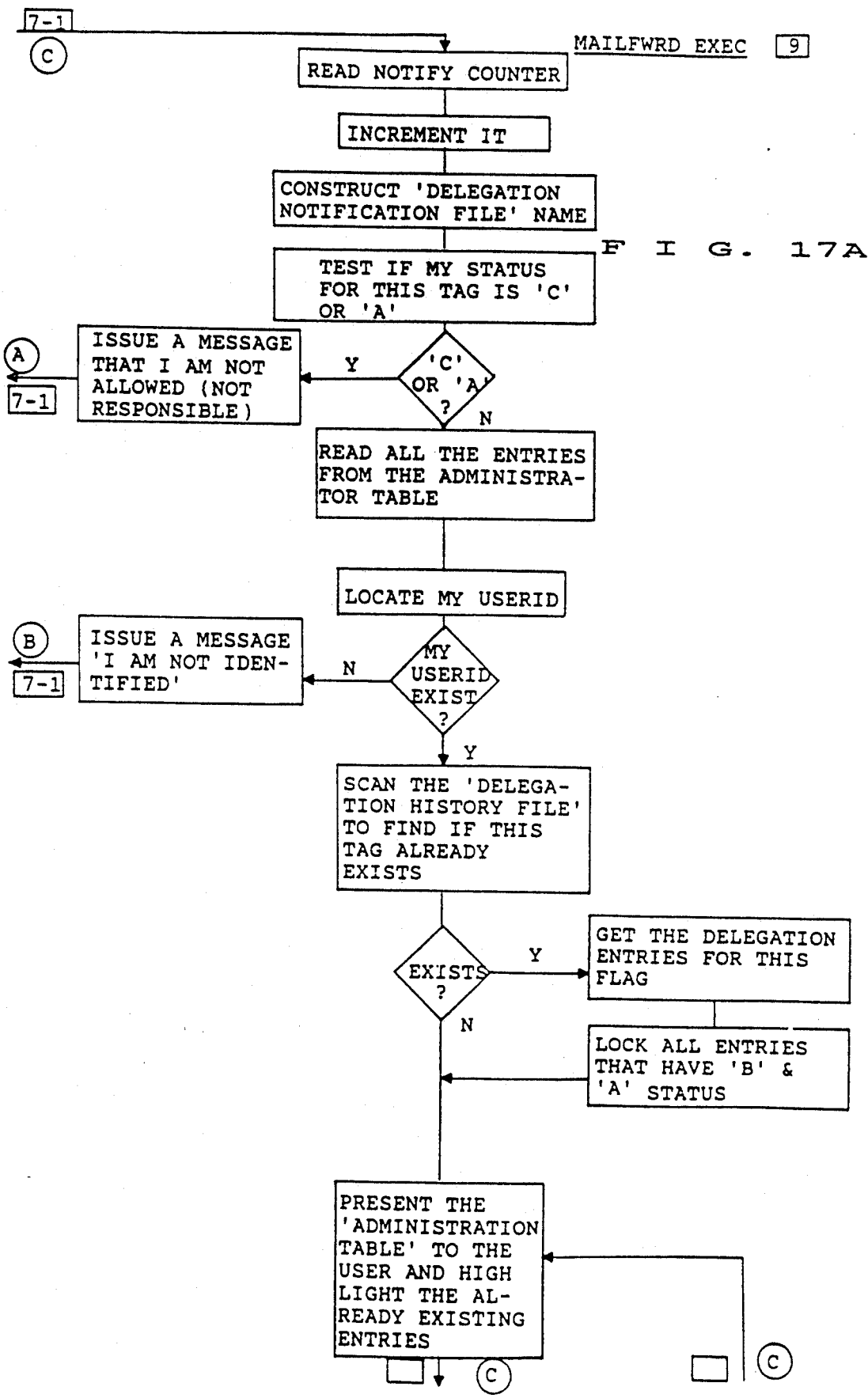
Figure 17B:
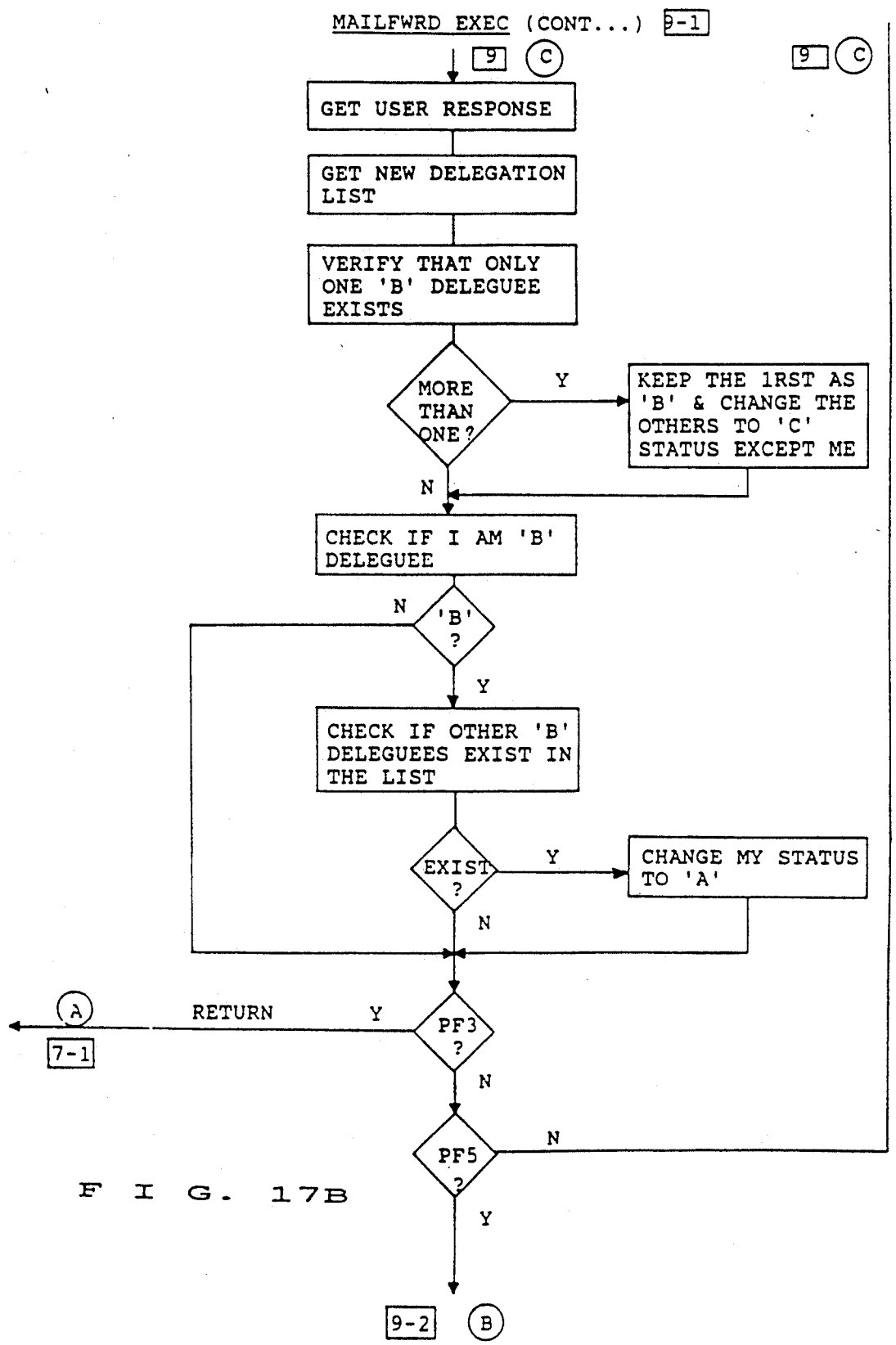

As represented in FIG. 13B, depressing PF7 in menu 1 calls MAILCREA EXEC (see flow chart of FIG. 16).

This routine enables taking advantage of the follow-up system even for non-electronic mail, e.g. paper mail, telephone calls, personal activities and reports etc... by entering a tag from the keyboard. For that purpose, wise the tag will show on the "To Be Assigned" screen. Obviously, features like "EDIT" for editing the corresponding mail will not be available in this case.

As represented in FIG. 16, the routine involves first getting the last sequence number in the Tag Counter, incrementing it by one to get the Tag current sequence number (e.g. 1756). Then "Mail Create Screen" is presented on the terminal display. The system reads the user's field modifications, then checks the TGT DATE contents to decide on filing the tag either in the "To Be Assigned" file, or in the "To Be Answered" file depending whether the TGT DATE field has been filled-in or not. A date validity check has also been provided enabling correcting any date error prior to quitting MAILCREA EXEC and branching back to MAILASSG EXEC.

As already mentioned, while running MAILANSW EXEC depressing PF8 calls MAILFWRD (see FIGS. 17A–B) to present and process the delegation menu. The user gets on the screen a table including the names, userids and nodeids of the persons belonging to the group commonly served and administrated. said group may have been divided into subgroups (with a reference number 0, 1, 2, etc. . . ). Said displayed table also includes a flag "F" field wherein the user may write B for responsible; C for reviewer or D for deleted. By entering one of these letters as a flag in front of one of the persons in the table, delegation or deletion of delegation is operated.

Also, by answering a question by Yes or No (NO being set by default), one may attach the document to the delegation tag. Attach, meaning here provide the deleguee with means for getting the full text mail considered, or in other words, transferring both the tag and the tagged mail (or means for accessing said mail).

In other words, a notify counter is first read and incremented and a delegation notification file prepared. A test is made to check whether the user is responsible (tag status neither C nor A) and therefore can delegate the job of answering the considered mail. If he/she is not responsible, then the system issues a message and branches back to MAILANSW EXEC. Otherwise the entries from the administrator table are read and the considered userid looked for. Should the userid exist, then a delegation history file is scanned to determine whether delegation tag already exists. The administration table is presented with highlighted already existing entries (e.g. DOC NBR, addressee name and userid).

The user's typed choice is read and checked. Should more than one responsible deleguee be set, then only the first one on the list is maintained and the others are assigned reviewer job. Then, assuming the user himself be a "responsible" deleguee, while responsibility is also assigned to another member of the group, then the user's status is converted to addressee.

Depressing PF3 enables quitting delegation menu or depressing PF5 confirms the delegation choices made and switches back to presenting "MAIL TO BE ANSWERED" Panel to the user.

From that moment on, the addressee sees his status (A or B) in his/her document mail tag, indicating that the delegation process has been used. A tag is sent to the "Mail To Be Answered" log of the Responsible and possible Reviewers, consequently flagged with the appropriate letter (B or C).

If the addressee only assigns Reviewers (C), keeping responsibility for the answer, his/her flag is automatically changed from A to B.

The associated document must be separately forwarded to the person(s) involved as Responsible or Reviewer(s). A $FLPxxxx file containing the delegation information is forwarded to the involved users. No user action is required: the follow-up program will read it automatically when invoked. The addressee and Reviewers' tag will automatically be processed when the Responsible enters the answer date.

As mentioned in connection with FIG. 13B, depressing the PF12 key enters a MORINFO routine (MAILMORI EXEC) to present a screen named "More Info For Document NBR X" wherein X is the reference number for the document being processed. This displays information, considered as mail characteristics, such as:
Subject
Origin
Date document received
Target date
Document type
Where found (e.g. name of Notelog or Notebook)
Delegation status If delegation function has been used, the name of all involved addressee(s), Responsible and Reviewer(s) are displayed along with the dates.

Addresses are sequentially numbered in case of multiple transfers during the delegation process. In any case, a unique individual is responsible to provide the answer. The MORINFO flow chart is shown in FIG. 18. The mail characteristics are first fetched out of the mail. Then a checking on delegation situation is operated using the delegation list. this enables giving a warning message for any incompatibility barring adding information to a considered tag. Otherwise, the mail characteristics are displayed together with a pointed at zone for entering information one wishes to add to the considered tag, and then return to displaying the "Mail To Be Answered" panel.

As represented in FIG. 13B, depressing the functional key PF2 while operating in menu 2 calls a MAILSRCH routing for search among answered mail. Obviously this function is an added one which emphasizes the interest of the follow-up system by showing how functions may be added. This routine enables searching among answered mail. It displays a set of fields interconnected with logic expressions AND/OR. By simply typing keywords in said fields, the user may define the query operation to be activated for searching. The system then displays the corresponding detected mail tags upon which operations such as displaying more information or reactivating a selected tag may be performed.

Figure 19B:
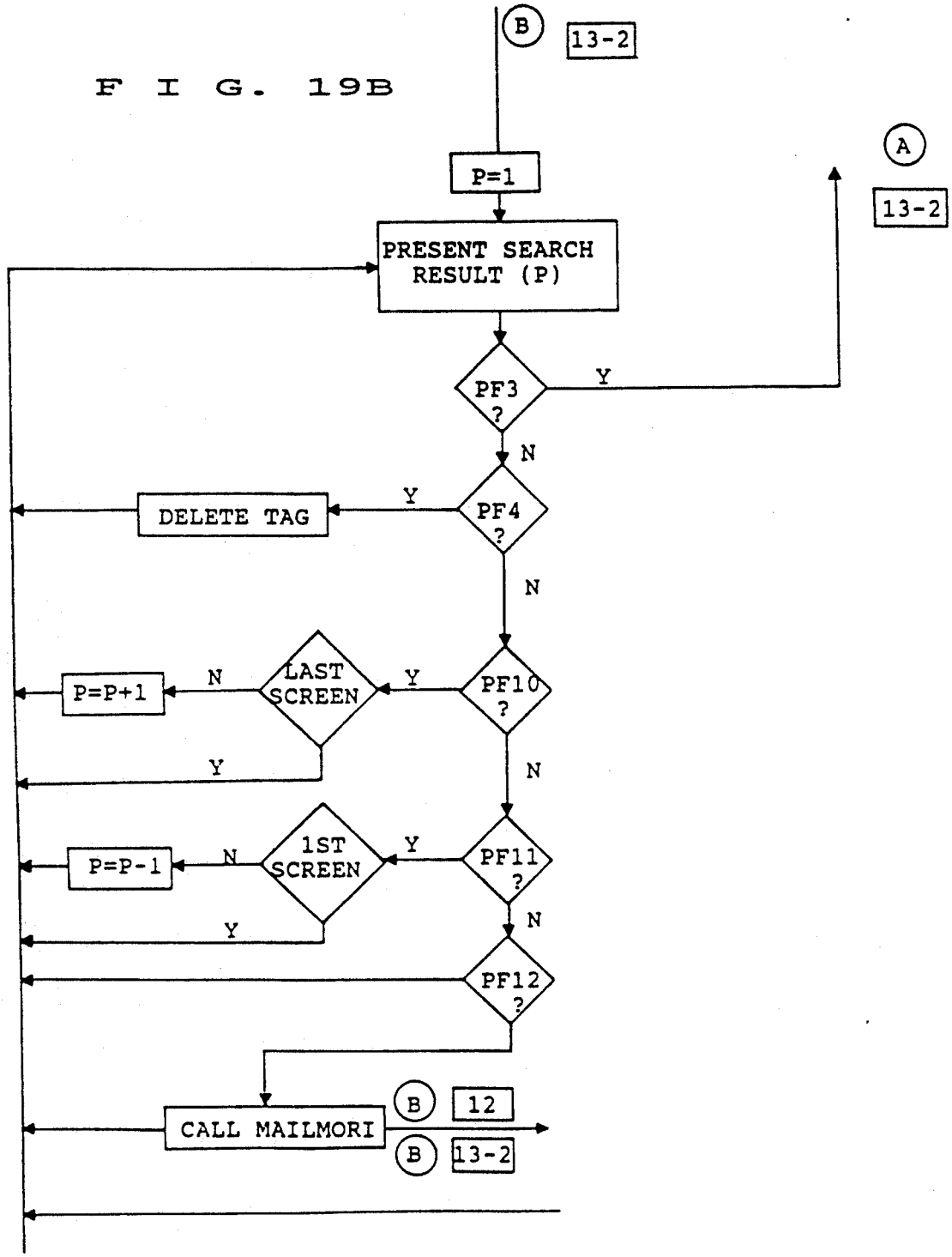

Represented in FIG. 19 (including 19A and B), is the MAILSRCH EXEC. When run, this program module scans the history file tags and checks for availability to the requester. Then, the system will get and sort the answered file tags by answer date and then present a search panel for entering dates and search arguments. Depressing PF3 exits from MAILSRCH and back to MAILANSW EXEC. Otherwise the system checks for match between the tags answer date and the searching date limits set. Then searching is operated based on the logical search argument and present the result tags and the results are displayed.

Functional keys customization are self explanatory, e.g. PF2 calls for the MAILMORI EXEC.

As already mentioned, the mail processed by a follow-up user may also be tracked by an assigned secretary. For that purpose, in addition to the files (buffers) available to any conventional user as disclosed above, the secretary's machine is assigned a "Notification File", a "Monitoring File", a "Delegation Notification File", and an "Answered Delegation File". The secretary follows the mail tags that have passed the threshold limit and reviews them with the manager to develop an action plan to have the document answered in due time.

The secretary may record statistical data to be presented to management. Tracking capabilities may be defined by: number of received documents (mail), number of assigned documents; number of answered documents (in/out target) and number of deleted documents.

This is made possible by modifying the secretary's PROFILE EXEC to include a MAILSECF EXEC to be executed at LOGON time or upon typing "MAIL-MONI" command in CMS Mode.

Figure 20:
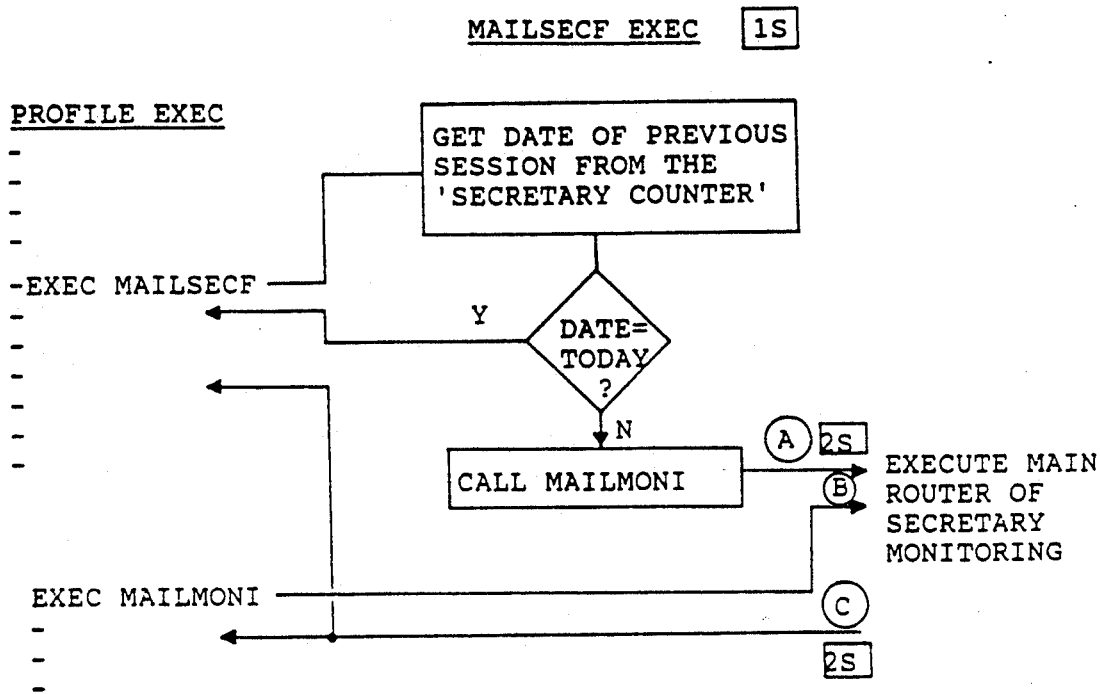
FIGS. 20–23 are flow-charts for implementing secretary monitoring of followed-up mail.
Figure 21:
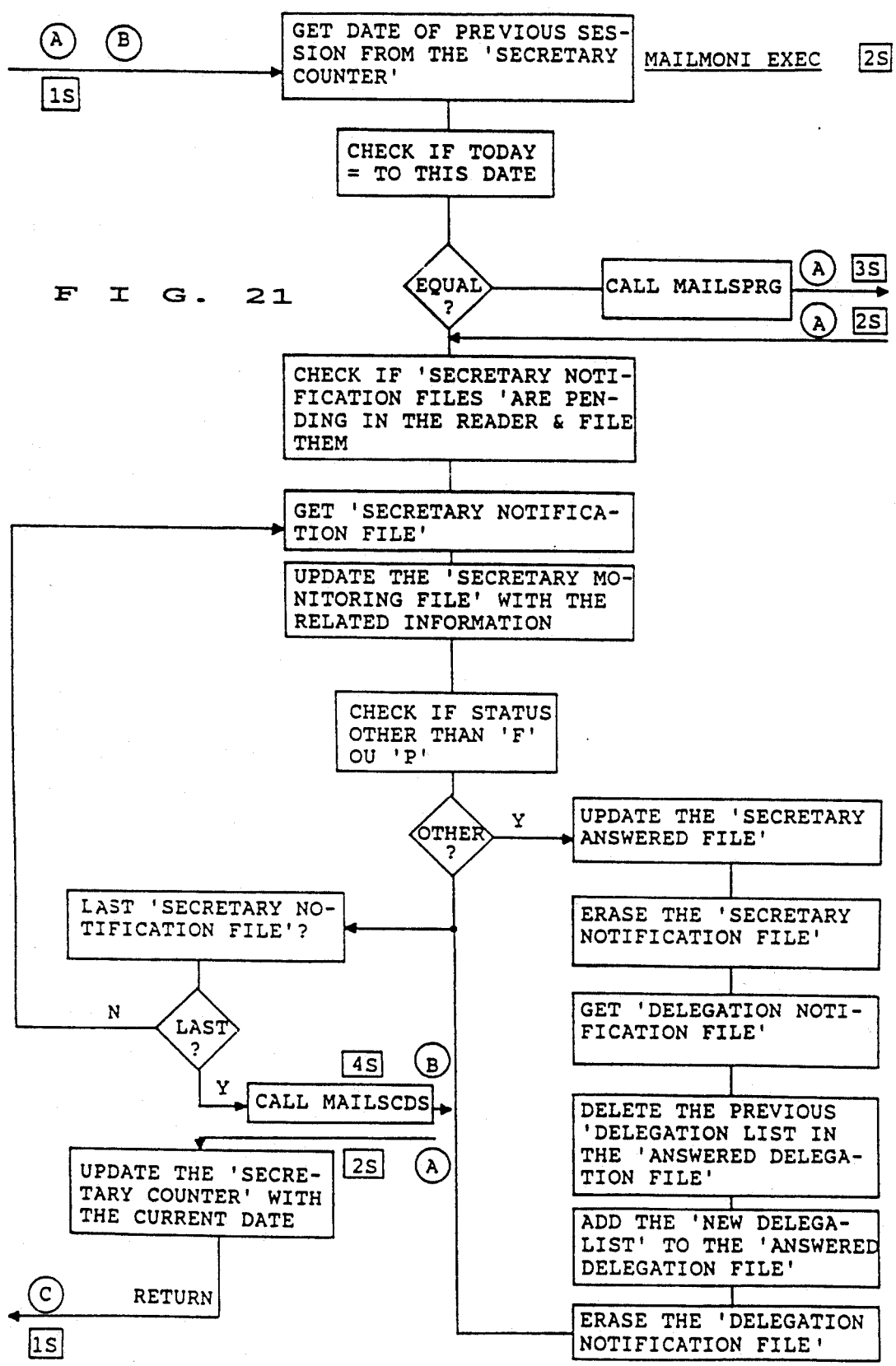

The above process is represented in flowchart of FIG. 20. When reaching the exec MAILSECF instruction inserted into the secretary's Profile Exec, the system fetches the contents of a secretary counter loaded with the date of each session. Should said date be the current date, then the system branches back to Profile Exec and proceeds on. Otherwise it branches to the MAILMONI routine of FIG. 21.

The "Secretary Monitoring" file is evolutive along the day: e.g. a tag that has a status of "TARGET-1" will have a status of "Answered" when the user has assigned an answered date. At 1rst Logon of the day all the tags that have been processed during the previous day (answered, deleted, privated, delayed) are purged from the monitor in file through MAILSPRG routine.

Figure 22:
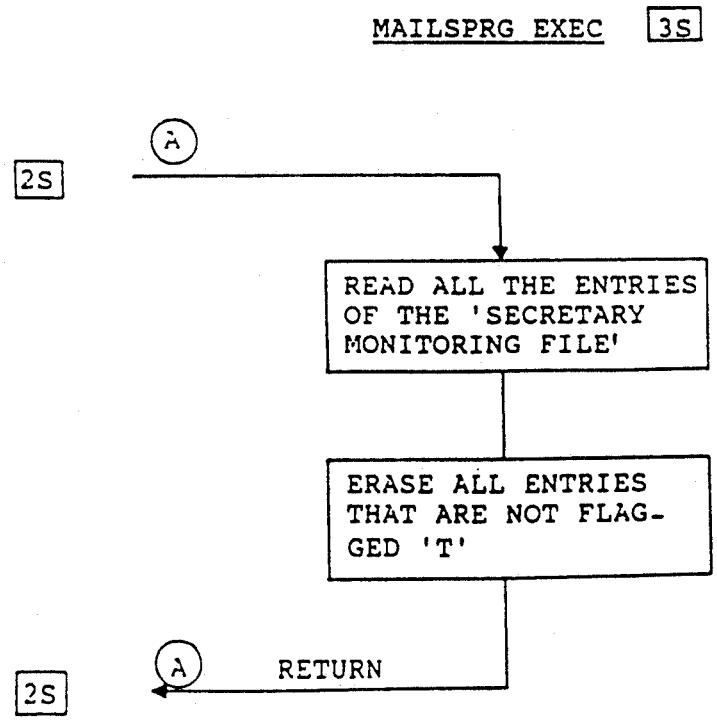

According to this routine the system reads the secretary counter containing the date of previous session, and compares it with current date. Should they match, the system branches to MAILSPRG routine to update the entries (see FIG. 22). It reads all the entries of the Secretary Monitoring File containing the monitored mail and erase all entries which are not flagged "T" i.e. which did not reach the first threshold set for answering the corresponding mail.

The routine branches then back to MAILMONI EXEC and checks if Secretary Notification Files have been received in the secretary machine reader (entering buffer) and file them. The system then gets the Secretary Notification File and uses this file contents to update the Secretary Monitoring File accordingly.

The system then checks whether the status of any mail is NOT F (for delayed) or P (for privated). Should the answer be positive, all secretary's files need be updated starting with the Secretary Answered File; then erasing the Secretary Notification File; getting the Delegation Notification File; deleting the previous Delegation list in the Answered Delegation File; adding the New Delegation List to the Answered Delegation File; and erasing the Delegation Notification File; prior to branching back to the Secretary Notification File for scanning up to last Secretary Notification File.

Figure 23:
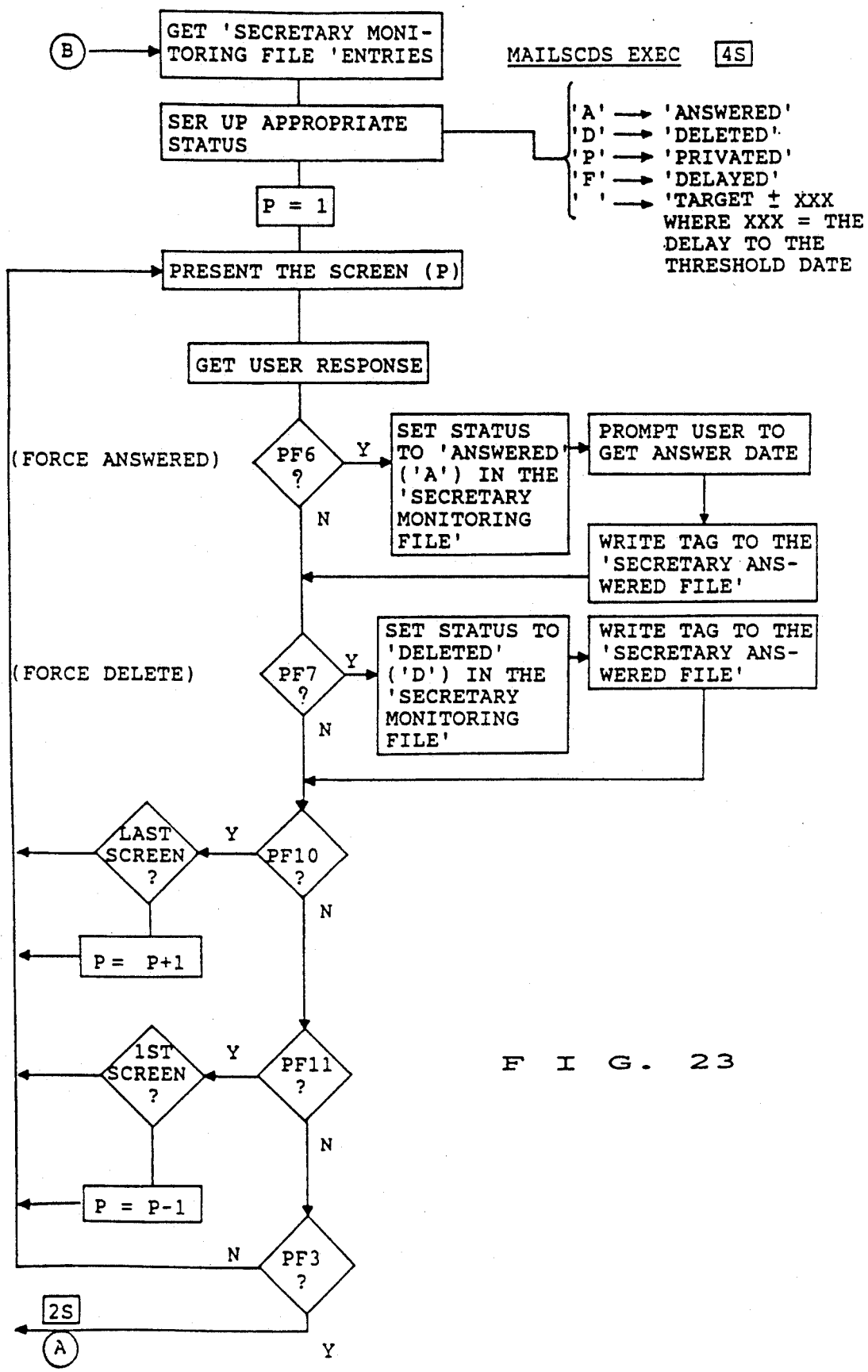

When last file is checked, the MAILMONI EXEC branches to the routine MAILSCDS EXEC (see FIG. 23) controlling the secretary Monitoring display as represented hereunder.

that the current date is within the threshold (set under local administrative decision).

As represented in the Mail Monitoring display, functional keys have been customized. Some functions like QUIT; PRINT; FWRD (for forward) and BKWRD (for backward) are self explanatory. PF6=FORCE ANSWER and PF7=FORCE DELETE have been added. PF6 to overcome any accidental discrepancies between user's and secretary's tags which normally should automatically match, by updating the Secretary Monitoring File when the corresponding mail is transferred to the user's Answered file. PF7 to overcome any discrepancy's regarding deleted tags.

In conclusion, the follow-up system not only enables automatically generating predesigned mail tags, filling these tags with data fetched out of exchanged mail, displaying and processing the mail tags and/or corresponding mail, but it also enables performing various administrative operations. These operations may go from simple secretarial monitoring, to more complex mail processing on a group basis including under administrator's control.

What is claimed is:

1. An electronic mail follow-up system for utilization in conjunction with an electronic mail item transmission and reception facility within a data processing network having a plurality of users enrolled therein, said electronic mail follow-up system comprising:
    assignment means within said data processing network for generating a plurality of mail tags having predefined fields therein and assigning a mail tag to each mail item received by a selected user;
    data determination means within said data processing network for automatically fetching or deriving from each mail item received by a selected user predefined characteristic mail data;
    recordation means coupled to said data determination means within said data processing network for recording said predefined characteristic mail data into corresponding predefined fields within each assigned mail tag;

---

Status ↓

June 06, 1986      MAIL MONITORING      Friday D157 W23 **
Bartin Franck      DOC NBR : 86157LAG0192   TRGT: 86 06 06   ** ANSWERED *
SUBJECT: MEETING NOTICE                                      FROM: MILLE C.
Cavelier JP        DOC NBR : 86157LAG0200   TRGT: 86 06 11   ** TARGET−5 *
SUBJECT: MEETING                                             FROM: MILLE C.
Mille Claude       DOC NBR : 86157PFN0180   TRGT: 86 06 08   ** TARGET−2 *
SUBJECT: CHECK POINT                                         FROM: MILLE C.
Mulot P.           DOC NBR : 86157PFN195    TRGT: 86 06 05   ** TARGET+1 *
SUBJECT: CHECK POINT                                         FROM: MILLE C.
PF3==> QUIT   PF6==> FORCE ANSWER   PF7==> FORCE DELETE
PF9==> PRINT  PF10==> FWRD   PF11==> BKWRD

---

MAILSCDS EXEC starts with getting the Secretary Monitoring File entries and setting up the appropriate files statuses. Selected types of statuses are:
  "A"=ANSWERED=An answer date has been entered by user.
  "D"=DELETED=The document tag has been deleted.
  "P"=PRIVATED=The user has modified the selection flag from S to P.
  "F"=DELAYED=The user has modified the target date.
  TARGET-XX=XX represents the delay to threshold date. This status is made to call the corresponding mail to the secretary's attention by indicating means responsive to said recordation means for storing mail tags including said predefined characteristics mail data within a predefined storage facility within said data processing network; and
mail management means coupled to said predefined storage facility within said data processing network for accessing and processing mail tags stored therein and for transferring selected mail tags into a second predefined storage facility in response to said predefined characteristic mail data wherein mail items may be managed utilizing said mail tags.

2. The electronic mail follow-up system according to claim 1, wherein each of said plurality of users enrolled within said data processing network has associated therewith at least one mail storage log within said data processing network and wherein said data determination means comprises means for automatically fetching or deriving from each mail item received by a selected user predefined characteristic mail data in response to a transfer of a mail item into a mail storage log associated with said selected user.

3. The electronic mail follow-up system according to claim 1, further including a sequence number counter and means for assigning a unique sequence number to each mail item received by said selected user.

4. The electronic mail follow-up system according to claim 3, wherein said data determination means includes means for fetching said unique sequence number assigned to each mail item.

5. The electronic mail follow-up system according to claim 4, wherein said recordation means includes means for recording said unique sequence number assigned to each mail item into a corresponding predefined field within an assigned mail tag.

* * * * *